(12) United States Patent
Butt

(10) Patent No.: US 12,457,557 B2
(45) Date of Patent: Oct. 28, 2025

(54) TERMINAL DEVICE COMMUNICATION

(71) Applicant: Nokia Solutions and Networks Oy, Espoo (FI)

(72) Inventor: Muhammad Majid Butt, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/042,825

(22) Filed: Jan. 31, 2025

(65) Prior Publication Data

US 2025/0261122 A1    Aug. 14, 2025

(30) Foreign Application Priority Data

Feb. 13, 2024   (FI) .................................... 20245152

(51) Int. Cl.
*H04W 52/02*   (2009.01)

(52) U.S. Cl.
CPC .............................. *H04W 52/0261* (2013.01)

(58) Field of Classification Search
CPC ................................................ H04W 52/0261
USPC ......... 370/311; 455/127.5, 343.1–343.5, 574
See application file for complete search history.

(56) References Cited

U.S. PATENT DOCUMENTS

| 11,540,223 | B2 | 12/2022 | Butt et al. | |
|---|---|---|---|---|
| 2003/0104848 | A1* | 6/2003 | Brideglall | G06K 7/0008 |
| | | | | 455/574 |
| 2017/0041915 | A1 | 2/2017 | Gupta et al. | |

(Continued)

FOREIGN PATENT DOCUMENTS

| JP | 2009064315 A | 3/2009 |
|---|---|---|
| WO | 2017/046143 A1 | 3/2017 |
| WO | 2023/060536 A1 | 4/2023 |

(Continued)

OTHER PUBLICATIONS

"3rd Generation Partnership Project; Technical Specification Group Services and System Aspects; Study on Ambient power-enabled Internet of Things (Release 19)", 3GPP TR 22.840, V2.0.0, Sep. 2023, 120 pages.

(Continued)

*Primary Examiner* — Michael Y Mapa
(74) *Attorney, Agent, or Firm* — Nokia Technologies Oy

(57) ABSTRACT

A method, apparatus and computer program is described comprising: obtaining information, said information being associated with one or more transmissions from a terminal device, said terminal device comprising: a transmitter for transmitting data in first and second modes, wherein, in the first mode transmitting data comprises modulating said data on a backscattered signal, and wherein, in the second mode transmitting data comprises actively generating and transmitting a signal on which said data is modulated; determining from said information whether said terminal device's stored energy is above or below a first threshold; selecting the second mode if the amount of energy stored by said terminal device is determined to be above said threshold, and selecting the first or second mode if the amount of energy stored by said terminal device is determined to be below said threshold; and providing to said terminal device an instruction to operate in the selected mode for one or more transmissions.

13 Claims, 10 Drawing Sheets

(56) References Cited

U.S. PATENT DOCUMENTS

| | | | | |
|---|---|---|---|---|
| 2019/0074915 A1* | 3/2019 | Greene | ................ | H04W 76/28 |
| 2022/0352751 A1 | 11/2022 | Elshafie et al. | | |

FOREIGN PATENT DOCUMENTS

| | | | | |
|---|---|---|---|---|
| WO | 2023/132978 A1 | 7/2023 | | |
| WO | 2023/137739 A1 | 7/2023 | | |
| WO | 2023/159495 A1 | 8/2023 | | |
| WO | WO-2023236175 A1 * | 12/2023 | ............. | H04B 1/401 |

OTHER PUBLICATIONS

"3rd Generation Partnership Project; Technical Specification Group Services and System Aspects; Study on Interconnect of SNPN; (Release 19)", 3GPP TR 22.848, V0.2.0, Aug. 2023, pp. 1-19.

"New SID: Study on Ambient IoT", 3GPP TSG RAN#97e, RP-222685, Agenda: 9.1, Huawei, Sep. 12-16, 2022, 5 pages.

"3rd Generation Partnership Project; Technical Specification Group Radio Access Network; Study on Ambient IoT (Internet of Things) in RAN (Release 18)", 3GPP TR 38.848 V0.1.0, Mar. 2023, pp. 1-17.

Lu et al., "Ambient Backscatter Assisted Wireless Powered Communications", IEEE Wireless Communications, vol. 25, No. 2, Apr. 2018, pp. 170-177.

Chen et al., "Resource Allocation Strategy for D2D-Assisted Edge Computing System with Hybrid Energy Harvesting", IEEE Access, vol. 8, Oct. 19, 2020, pp. 192643-192658.

Office Action received for corresponding Finnish Patent Application No. 20245152, dated Aug. 28, 2024, 13 pages.

Mostafa et al., "Transmit or Backscatter: Communication Mode Selection for Narrowband IoT Systems", IEEE Transactions on Vehicular Technology, vol. 71, No. 5, May 2022, pp. 5477-5491.

Office Action received for corresponding Finnish Patent Application No. 20245152, dated Feb. 27, 2025, 6 pages.

Extended European Search Report received for corresponding European Patent Application No. 25152156.3, dated Jul. 22, 2025, 10 pages.

"Ambient IoT and required RAN functionalities", 3GPP TSG-RAN #101, RP-231619, Agenda: 9.2.2, Nokia, Sep. 11-15, 2023, 9 pages.

* cited by examiner

TERMINAL DEVICE COMMUNICATION

RELATED APPLICATION

This application claims benefit of priority from Finnish Patent App. No. 20245152, filed Feb. 13, 2024, the disclosure of which is hereby incorporated in its entirety by reference herein.

FIELD

Example embodiments may relate to systems, methods and/or computer programs relating to terminal device communications.

BACKGROUND

There remains a need to enable efficient communications between network devices and terminal devices.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising at least one processor and at least one memory storing instructions that, when executed by the at least one processor, cause the apparatus at least to: obtain information associated with one or more transmissions from a terminal device, said terminal device comprising: a transmitter configured to transmit data in first and second modes, wherein, in the first mode transmitting data comprises modulating said data on a backscattered signal, and wherein, in the second mode transmitting data comprises actively generating and transmitting a signal on which said data is modulated; determine from said information whether said terminal device's stored energy is above or below a first threshold; select the second mode if the amount of energy stored by said terminal device is above said threshold, and select the first or second mode if the amount of energy stored by said terminal device is below said threshold; and provide to said terminal device an instruction to operate in the selected mode for one or more transmissions.

In some example embodiments, the instructions stored on the memory, when executed by the at least one processor, further cause the apparatus at least to: select one of a first and a second method of energy provision in response to determining that said terminal device's stored energy is below said first threshold, wherein said first method of energy provision comprises providing an activation signal for backscattering by said terminal device, and wherein said second method of energy provision comprises providing a radio frequency signal for energy harvesting by said terminal device; select the first mode in response to selecting the first method of energy provision, and select the second mode in response to selecting the second method of energy provision; and provide energy to the terminal device using the selected method of energy provision; and additionally or alternatively provide an instruction to a further device to provide energy to the terminal device using the selected method of energy provision.

In some example embodiments, the instructions stored on the memory, when executed by the at least one processor, further cause the apparatus at least to: identify one or more candidate devices available for providing energy using the first method of energy provision; determine whether an activation signal provided by a device of the one or more candidate devices would arrive at the terminal device with sufficient strength to enable the terminal device to make transmissions in the first mode, wherein the first method of energy provision is selected based at least in part on making said determination; select a device of the one or more candidate devices as a source of energy based at least in part upon determining that an activation signal generated by said device would arrive at the terminal device with sufficient strength to enable transmissions by the terminal device in the first mode; and provide energy to the terminal device using the first method of energy provision if the selected device is the apparatus; and additionally or alternatively provide an instruction to a further device to provide energy to the terminal device using the first method of energy provision if the selected device is said further device.

In some example embodiments, determining whether an activation signal would arrive with sufficient strength is based at least in part upon at least one of: a strength of a potential activation signal provided by a candidate device; a predicted level of attenuation of the activation signal between said candidate device and the terminal device; or an activation signal strength at the candidate device needed to enable transmissions in the first mode.

In some example embodiments, the instructions stored on the memory, when executed by the at least one processor, further cause the apparatus at least to select a potential activation signal based upon at least one of: the capabilities of the candidate device; or an allowable limit of activation signal strength.

In some example embodiments, the instructions stored on the memory, when executed by the at least one processor, further cause the apparatus at least to: determine whether there are no candidate devices available for providing energy using the first method of energy provision, or determine whether an activation signal provided by a device of one or more candidate devices would not arrive at the terminal device with sufficient strength to enable the terminal device to make transmissions in the first mode; select a device for providing energy using the second method of energy provision in response to determining that there are no candidate devices available for providing energy using the first method of energy provision, or in response to determining that an activation signal provided by a device of one or more candidate devices would not arrive at the terminal device with sufficient strength to enable the terminal device to make transmissions in the first mode; and provide energy to the terminal device using the second method of energy provision if the selected device is the apparatus; and additionally or alternatively provide an instruction to a further device to provide energy to the terminal device using the second method of energy provision if the selected device is said further device.

In some example embodiments, determining that an activation signal provided by a device of the one or more candidate devices would not arrive at the terminal device with sufficient strength to enable the terminal device to make transmissions in the first mode is based at least in part upon determining that an activation signal provided by the respective candidate device in the past has not resulted in a backscattered transmission by the terminal device that has been received by the network.

In some example embodiments, the first threshold corresponds to an amount of energy that is at least as large as an amount of energy needed by the terminal device to make one transmission in the second mode.

In some example embodiments, the instructions stored on the memory, when executed by the at least one processor, further cause the apparatus to provide a query to the terminal device, and wherein the information associated with one or more transmissions from a terminal device comprises a response to said query.

In some example embodiments, the instructions stored on the memory, when executed by the at least one processor, further cause the apparatus at least to: start a timer; reset the timer upon receiving data; and send the query in response to the timer exceeding a timer threshold.

In some example embodiments, the instructions stored on the memory, when executed by the at least one processor, further cause the apparatus at least to reset the timer if the apparatus does not receive a response to the query.

In some example embodiments, the instructions stored on the memory, when executed by the at least one processor, further cause the apparatus at least to reset the timer if the apparatus receives a response to the query indicating that the terminal device does not have data for transmission.

In some example embodiments, the instructions stored on the memory, when executed by the at least one processor, further cause the apparatus at least to reset the timer if the apparatus receives a request from the terminal device indicating that the terminal device's stored energy is below the first threshold.

According to a second aspect, there is described a device comprising: a transmitter configured to transmit data in first and second modes wherein, in the first mode transmitting data comprises modulating said data on a backscattered signal, and wherein, in the second mode transmitting data comprises actively generating and transmitting a signal on which said data is modulated; a controller configured to provide information to a network device using the transmitter, said information indicating whether the device's stored energy is above or below a first threshold; a receiver configured to obtain an instruction from the network device to operate in one of the first and second modes for one or more transmissions; and wherein the controller is further configured to set the mode in which the transmitter operates to the instructed mode.

In some example embodiments, the first threshold corresponds to an amount of energy that is at least as large as an amount of energy needed by the device to make one transmission in the second mode.

In some example embodiments, the controller is configured to determine whether an amount of energy stored by the device is below the first threshold, and wherein the controller is configured to provide information indicating whether the device's stored energy is above or below the first threshold in response to determining that an amount of energy stored by the device is below the first threshold.

In some example embodiments: the controller is configured to determine whether an amount of energy stored by the device is above a second threshold, wherein the second threshold is higher than the first threshold; and the controller is configured to set the mode in which the transmitter operates to the second mode in response to making said determining that an amount of energy stored by the device is above the second threshold, wherein the second threshold is higher than the first threshold when operating in the first mode.

In some example embodiments, the transmitter is configured to provide to the network device an indication that the device will operate in the second mode in response to the controller determining that an amount of energy stored by the device is above the second threshold.

According to a third aspect, there is described a method comprising: obtaining information, said information being associated with one or more transmissions from a terminal device, said terminal device comprising: a transmitter for transmitting data in first and second modes, wherein, in the first mode transmitting data comprises modulating said data on a backscattered signal, and wherein, in the second mode transmitting data comprises actively generating and transmitting a signal on which said data is modulated; determining from said information whether said terminal device's stored energy is above or below a first threshold; selecting the second mode if the amount of energy stored by said terminal device is determined to be above said threshold, and selecting the first or second mode if the amount of energy stored by said terminal device is determined to be below said threshold; and providing to said terminal device an instruction to operate in the selected mode for one or more transmissions.

According to a fourth aspect, there is described a method comprising: providing information to a network device using a transmitter, wherein said transmitter is configured to transmit data in first and second modes wherein, in the first mode transmitting data comprises modulating said data on a backscattered signal, and wherein, in the second mode transmitting data comprises actively generating and transmitting a signal on which said data is modulated, and wherein, the information indicates whether the device's stored energy is above or below a first threshold; obtaining an instruction from the network device to operate in one of the first and second modes for one or more transmissions; and setting the mode in which the transmitter operates to the instructed mode.

According to a fifth aspect, there is provided a non-transitory computer readable storage medium comprising program instructions which stored thereon for performing at least the following: obtaining information, said information being associated with one or more transmissions from a terminal device, said terminal device comprising: a transmitter for transmitting data in first and second modes, wherein, in the first mode transmitting data comprises modulating said data on a backscattered signal, and wherein, in the second mode transmitting data comprises actively generating and transmitting a signal on which said data is modulated; determining from said information whether said terminal device's stored energy is above or below a first threshold; selecting the second mode if the amount of energy stored by said terminal device is determined to be above said threshold, and selecting the first or second mode if the amount of energy stored by said terminal device is determined to be below said threshold; and providing to said terminal device an instruction to operate in the selected mode for one or more transmissions.

According to a sixth aspect, there is provided a non-transitory computer readable storage medium comprising program instructions which stored thereon for performing at least the following: providing information to a network device using a transmitter, wherein said transmitter is configured to transmit data in first and second modes wherein, in the first mode transmitting data comprises modulating said data on a backscattered signal, and wherein, in the second mode transmitting data comprises actively generating and transmitting a signal on which said data is modulated, and wherein, the information indicates whether the device's stored energy is above or below a first threshold; obtaining an instruction from the network device to operate in one of the first and second modes for one or more transmissions; and setting the mode in which the transmitter operates to the instructed mode.

According to a seventh aspect, there is provided an apparatus comprising: means for obtaining information, said information being associated with one or more transmissions from a terminal device, said terminal device comprising: means for transmitting data in first and second modes, wherein, in the first mode transmitting data comprises modulating said data on a backscattered signal, and wherein, in the second mode transmitting data comprises actively generating and transmitting a signal on which said data is modulated; means for determining from said information whether said terminal device's stored energy is above or below a first threshold; means for selecting the second mode if the amount of energy stored by said terminal device is determined to be above said threshold, and selecting the first or second mode if the amount of energy stored by said terminal device is determined to be below said threshold; and means for providing to said terminal device an instruction to operate in the selected mode for one or more transmissions.

According to an eighth aspect, there is provided a device comprising: means for transmitting data in first and second modes wherein, in the first mode transmitting data comprises modulating said data on a backscattered signal, and wherein, in the second mode transmitting data comprises actively generating and transmitting a signal on which said data is modulated; means for providing information to a network device using the means for transmitting data, said information indicating whether the device's stored energy is above or below a first threshold; means for obtaining an instruction from the network device to operate in one of the first and second modes for one or more transmissions; and means for setting the mode in which the means for transmitting data operates to the instructed mode.

According to a ninth aspect, there is provided a method comprising: obtaining information, said information being associated with one or more transmissions from a terminal device, said terminal device comprising: means for transmitting data in first and second modes, wherein, in the first mode transmitting data comprises modulating said data on a backscattered signal, and wherein, in the second mode transmitting data comprises actively generating and transmitting a signal on which said data is modulated; selecting, based at least in part on said information, a mode of the first and second modes; and providing to said terminal device an instruction to operate in the selected mode for one or more transmissions.

According to a tenth aspect, there is provided a method comprising: transmitting information to a network device using a means for transmitting data, wherein said means for transmitting data is configured to transmit data in first and second modes, wherein, in the first mode, transmitting data comprises modulating said data on a backscattered signal, and wherein, in the second mode transmitting data comprises actively generating and transmitting a signal on which said data is modulated; receiving an instruction from said network device to operate in one of the first and second modes for one or more transmissions; and setting the mode in which the data transmitting means operates to the instructed mode.

According to an eleventh aspect, there is provided a method comprising: providing a query to an energy harvesting device, said energy harvesting device comprising: means for transmitting data in active and backscattering modes, wherein, in the backscattering mode transmitting data comprises modulating said data on a backscattered signal, and wherein, in the active mode transmitting data comprises actively generating and transmitting a signal on which said data is modulated; obtaining a response to said query from said energy harvesting device; selecting, based at least in part on said response, one of the active mode and the backscattering mode; and providing to said energy harvesting device an instruction to operate in the selected mode for one or more transmissions.

According to a twelfth aspect, there is provided a method comprising: receiving a query from a network device at an energy harvesting device, said energy harvesting device comprising means for transmitting data in active and backscattering modes, wherein, in the backscattering mode transmitting data comprises modulating said data on a backscattered signal, and wherein, in the active mode transmitting data comprises actively generating and transmitting a signal on which said data is modulated; transmitting a response to said query to said network device using said means for transmitting data;

receiving an instruction from said network device to operate in one of the backscattering and active modes for one or more transmissions; and setting the mode in which the data transmitting means operates to the instructed mode.

According to a thirteenth aspect, there is provided a method comprising: receiving a request from an energy harvesting device, said energy harvesting device comprising means for transmitting data in active and backscattering modes, wherein, in a backscattering mode transmitting data comprises modulating said data on a backscattered signal, and wherein, in an active mode transmitting data comprises actively generating and transmitting a signal on which said data is modulated; selecting, based at least in part on said request, a mode of the backscattering and active modes; and providing to said energy harvesting device an instruction to operate in the selected mode for one or more transmissions.

According to a fourteenth aspect, there is provided a method comprising: transmitting, by an energy harvesting device, for receipt by a network device, a request, said energy harvesting device comprising means for transmitting data in active and backscattering modes, wherein, in the backscattering mode transmitting data comprises modulating said data on a backscattered signal, and wherein, in the active mode transmitting data comprises actively generating and transmitting a signal on which said data is modulated, wherein said request is a request to change the mode in which the means for transmitting data operates; receiving an instruction from said network device to operate in a mode of the backscattering and active modes for one or more transmissions; and setting the mode in which the data transmitting means operates to the instructed mode.

According to a fifteenth aspect, there is provided a computer-readable instructions which, when executed by a computing apparatus, cause the computing apparatus to perform (at least) any method as described herein (including the methods of the third, fourth, ninth, tenth, eleventh, twelfth, thirteenth and fourteenth aspects described above).

According to a sixteenth aspect, there is provided a computer-readable medium (such as a non-transitory computer-readable medium) comprising program instructions stored thereon for performing (at least) any method as described herein (including the methods of the third, fourth, ninth, tenth, eleventh, twelfth, thirteenth and fourteenth aspects described above).

According to a seventeenth aspect, there is provided an apparatus comprising: at least one processor; and at least one memory storing instructions which, when executed by the at least one processor, causes the apparatus to perform (at least) any method as described herein (including the methods of the third, fourth, ninth, tenth, eleventh, twelfth, thirteenth and fourteenth aspects described above).

BRIEF DESCRIPTION OF THE DRAWINGS

Example embodiments will now be described by way of non-limiting example, with reference to the accompanying drawings, in which.

DETAILED DESCRIPTION

Figure 1:
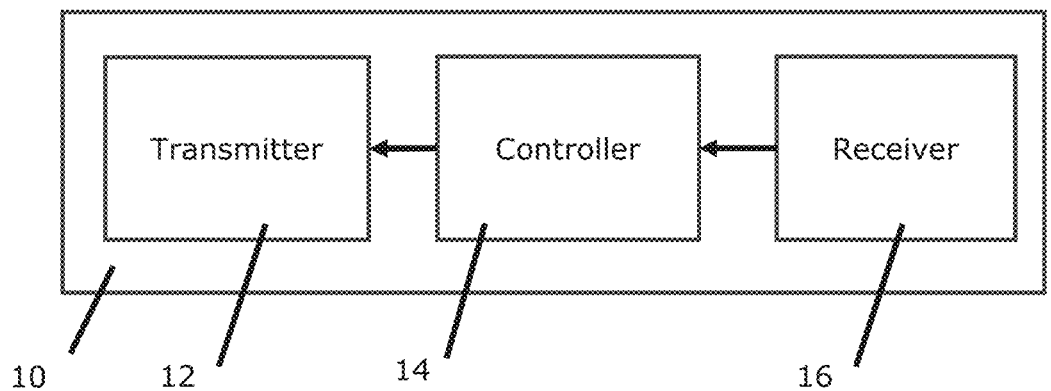
FIG. 1 is a block diagram of an apparatus in accordance with an example embodiment.

The scope of protection sought for various embodiments of the disclosure is set out by the independent claims. The embodiments and features, if any, described in the specification that do not fall under the scope of the independent claims are to be interpreted as examples useful for understanding various embodiments of the disclosure.

In the description and drawings, like reference numerals refer to like elements throughout.

Energy harvesting devices are devices that are able to harvest energy, typically wirelessly, for example from sources of electromagnetic radiation. For example, energy harvesting devices may harvest energy from one or more sources that might include: solar energy or visible light using a solar panel, radio waves, or vibrations.

In some cases, energy harvesting devices may harvest energy from radio waves generated by non-3GPP sources, such as radio waves used in the transmission of terrestrial television. Alternatively, or in addition, energy harvesting devices may harvest energy from radio waves generated by 3GPP sources, such as UEs or gNBs.

A device based on energy harvesting may, for example, operate in an active mode or a passive mode. The device itself uses energy harvested from wireless radio waves or any other form of energy that can be harvested in its particular deployment scenario and may be expected to operate with ultra-low power in the range from one microwatt to hundreds of microwatts. For example, if energy is harvested from wireless radio waves, the output power of an energy harvester might range from several micro-watts to tens of micro-watts. If a solar panel is used for energy harvesting from sunlight, the output power might be less than 1 milli-watt due to the small size of the solar panel.

An energy harvesting device can harvest energy and then use an active circuit to transmit like a conventional transmitter. Some energy harvesting devices, typically called Passive devices or tags, do not possess active transmission circuitry, and use backscattering to transmit data.

Radio frequency identification (RFID) solutions may rely on backscattering technology. Such RFID solutions may be enhanced, and new solutions may be developed through the application of 3GPP technologies. In particular, coverage may be enhanced, energy harvesting from a dedicated or ambient energy source may be introduced, and energy may be consumed more efficiently.

Devices implementing backscattering technology may be battery-less devices or devices with limited energy storage capabilities, and the energy can be provided by harvesting radio waves, visible light, other electromagnetic radiation, motion, etc.

Such devices may be suitable for operation as part of an internet of things (IoT). In some examples, an internet of things device that relies in part on harvested ambient energy may be referred to as an ambient internet of things (AIOT).

Ambient IoTs may be used in various industries, including logistics, manufacturing, transportation, energy, etc.

Devices capable of harvesting energy wirelessly and communicating wirelessly have advantages, for example in applications in which running wires and/or regularly replacing batteries is impractical. For example, in manufacturing or logistics, providing wired devices or devices having large batteries may be cost prohibitive if a large number of devices is to be used, or if articles to which the devices are to be affixed must be lightweight and/or portable. Moreover, if a device, such as a sensor, may be subjected to extreme environmental conditions, such as high pressure, extremely high/low temperatures, humidity, vibration, etc., then energy harvesting may be more practical than providing a wired connection or regularly replacing a battery.

Methods of communication by passive devices are provided. For example, as discussed in detail below, it is possible for some devices, upon receiving a suitable activation signal, to modulate data into the backscattering signal. The source of said activation signal may be the intended recipient of the data modulated into the backscattered signal, or the source may be some other device.

Devices capable of the aforementioned energy harvesting may, for example, be referred to as devices of an ambient internet of things (AIOT). Three types of AIOT devices have been proposed in 3GPP:

Type A: No energy storage, no independent signal generation/amplification, i.e., backscattering transmission.

Type B: Has energy storage, no independent signal generation, i.e., backscattering transmission. Use of stored energy can include amplification for reflected signals.

Type C: Has energy storage, has independent signal generation, i.e., active RF components for transmission.

Devices of types A and B typically cannot contact the network without receiving an activation signal, while device type C typically cannot contact the network if it has insufficient energy. Disadvantages of each device type may be offset by providing a hybrid device that may operate using backscattering transmission under some circumstances and may operate by generating signals using active RF components under other circumstances.

It may be advantageous to use type C if there is enough harvested energy available (particularly from non-3GPP source), as there is no dependency on activation signals from 3GPP source. If there is enough energy available, a larger range can be achieved with type C transmission.

However, if there is not enough energy available, backscattering mode transmission may be preferable to collect small amount of data from the device.

In a hybrid transceiver, both Device type B (backscattering) and type C (active transmission) modes are available for transmission. Depending on different considerations, a particular mode can be selected.

FIG. 1 is a block diagram of apparatus 10 according to an example embodiment of the invention. Apparatus 10 may be a network device. Apparatus 10 comprises transmitter 12, controller 14, and receiver 16. Receiver 16 is capable of obtaining information from one or more devices. In some example embodiments these may be terminal devices, hybrid energy harvesting devices, or other devices described herein. The said obtaining information from the devices may include indirect methods of transmission (e.g., in said obtaining information, information may be transmitted by an initial device to another intermediate device for transmission to the apparatus 10).

Transmitter 12 is capable of providing information to one or more devices. The said information may include instructions. The said providing information may include indirect methods of transmission (e.g., in said providing information, information may be transmitted by apparatus 10 to another device for transmission to a recipient device).

Controller 14 is in communication with transmitter 12 and receiver 16 such that received information may be processed and information for transmission may be determined by controller 14. Controller 14 may comprise a single physical component or a plurality of connected components.

In some example embodiments transmitter 12 and receiver 16 may together be embodied by a transceiver. A portion of the components for transmitting and receiving may be shared in said transceiver (e.g., an antenna may be shared).

Figure 2:
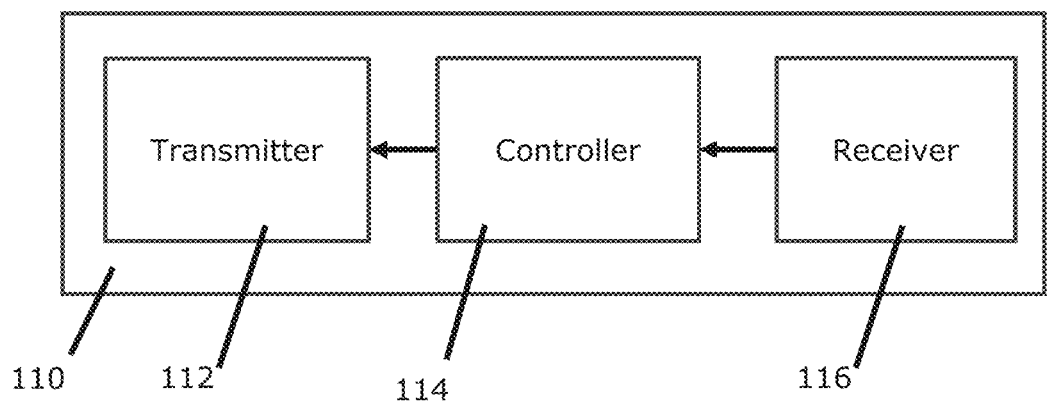
FIG. 2 is a block diagram of a device in accordance with an example embodiment.

FIG. 2 is a block diagram of device 110 according to an example embodiment of the invention. Device 110 may be a terminal device. Device 110 comprises transmitter 112, controller 114, and receiver 116.

Transmitter 112 is capable of transmitting data and may be used to transmit information to a network device. The said providing information may include indirect methods of transmission (e.g., in said providing information, information may be transmitted by device 110 to another device for transmission by another device to a recipient device). Transmitter 112 is capable of operating in two modes. In the first mode, transmitting data comprises modulating said data on a backscattered signal. In the second mode, transmitting data comprises actively generating and transmitting a signal on which said data is modulated. The first and second modes may rely on separate components, or at least a portion of the components used in transmitting in the first and second modes (e.g., the antenna) may be shared.

Receiver 116 is capable of obtaining information from a network device (such as the device 10). In some example embodiments the network device is a gNB node, or another 3GPP network device. Said obtaining information from a network device may include obtaining information through indirect methods of transmission (e.g., in said obtaining information, information may be transmitted by an initial device to another device for transmission to device 110)

Controller 114 is in communication with transmitter 112 and receiver 116 such that received information may be processed and information for transmission may be determined by controller 114. Controller 114 may comprise a single physical component or a plurality of connected components.

Device 110 may generate or otherwise obtain data for communication to a network. Said data may accumulate in a buffer in a memory within or accessible to controller 14 of device 10.

In some example embodiments transmitter 112 and receiver 116 may together be embodied by a transceiver. A portion of the components for transmitting and receiving may be shared in said transceiver (e.g., an antenna may be shared).

Figure 3:
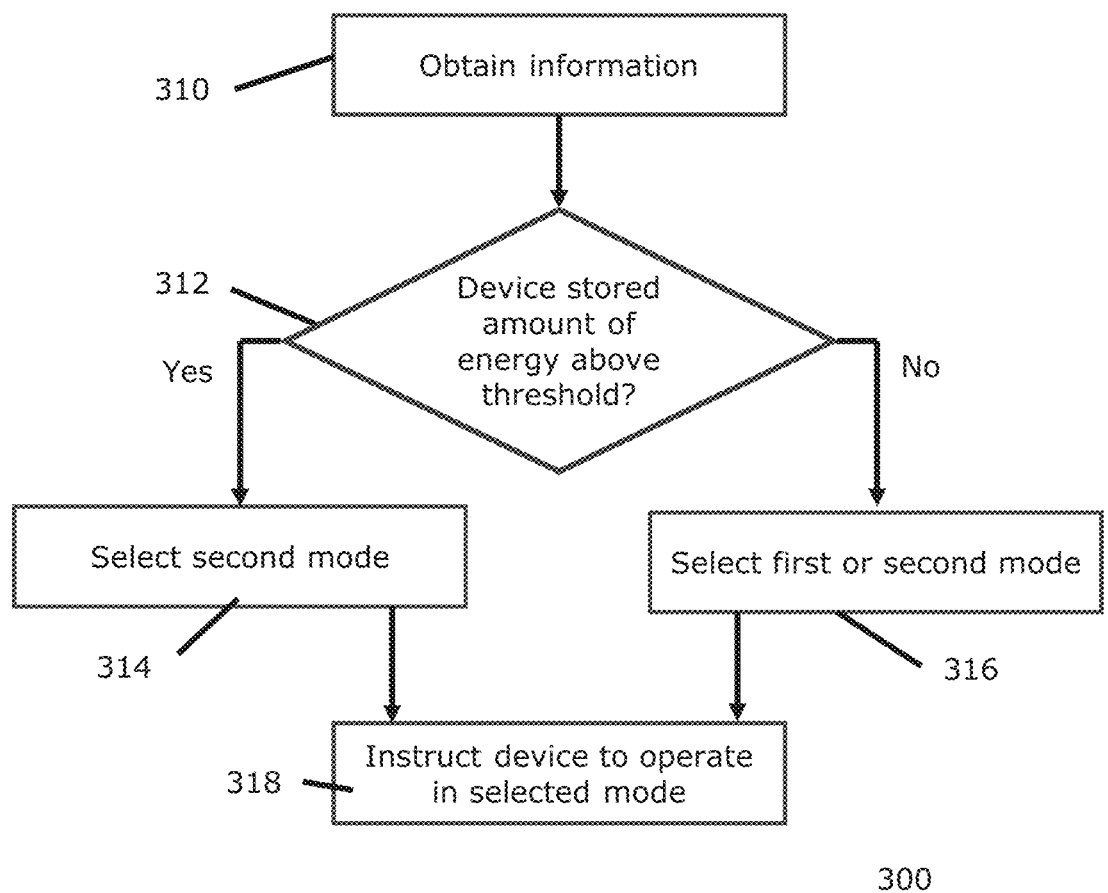
FIGS. 3 and 4 are flow charts showing methods in accordance with example embodiments.

FIG. 3 is a flow diagram of a method 300 according to an example embodiment of the invention. Method 300 may be carried out by apparatus 10.

At step 310, information associated with one or more transmissions from a terminal device is obtained. Said terminal device is capable of transmitting data in two modes, and may be a device such as device 110 in some example embodiments. In the first mode transmitting data comprises modulating said data on a backscattered signal. In the second mode, transmitting data comprises actively generating and transmitting a signal on which said data is modulated. In some embodiments receiver 16 of apparatus 10 obtains said information.

At step 312, apparatus 10 determines from the information obtained at step 310 whether device 110's stored energy is above or below a first threshold. If the amount of energy is above the first threshold, the method may proceed to step 314. If the amount of energy is not above the first threshold, the method may proceed to step 316.

At step 314 apparatus 10 selects the second mode in response to the amount of energy stored by device 110 being determined to be above the first threshold. This selecting may be performed by controller 14.

At step 316 apparatus 10 selects the first mode or the second mode in response to the amount of energy stored by device 110 being determined to be below the first threshold. This selecting may be performed by controller 14.

At step 318, apparatus 10 provides an instruction to device 110 to operate in the mode selected at step 314 or 316 for one or more transmissions.

In some example embodiments, this instruction is an instruction to operate in the selected mode for an unspecified number of transmissions (e.g., until otherwise instructed, until an amount of stored energy exceeds a threshold, until device 110 has not received an activation signal for a particular period, or until some other condition is met). In other example embodiments, this instruction is an instruction to operate in the selected mode for one operation (one transmission), or another number of operations.

In some example embodiments, in response to determining at step 312 that the device 110's stored energy is below the first threshold, apparatus 10 selects one of a first and second method of energy provision. The first method of energy provision comprises providing an activation signal for backscattering by device 110, and the second method of energy provision comprises providing a radio frequency signal for energy harvesting by device 110.

At selecting step 316 apparatus 10 may select the first mode in response to selecting the first method of energy provision, and the second mode in response to selecting the second method of energy provision.

Apparatus 10 may then cause energy to be provided to device 110 using the selected method of energy provision. In some examples, apparatus 10 may be capable of generating an activation signal or a radio frequency signal suitable for energy harvesting by device 110. Additionally or alternatively, apparatus 10 may instruct another device capable of providing energy using the selected method to provide the energy.

In some example embodiments, selecting one of the first and second methods of energy provision comprises identifying by apparatus 10 one or more candidate devices available for providing energy using the first method of energy provision. Selecting a method of energy provision may further comprise determining that an activation signal provided by a device of the one or more candidate devices would arrive at device 110 with sufficient strength to enable device 110 to make transmissions in the first mode, and selecting the first method of energy provision based at least in part on making said determination. A device of the one or more candidate devices may then be selected as a source of energy based at least in part upon determining that an activation signal generated by said device would arrive at device 110 with sufficient strength to enable transmissions by device 110 in the first mode. Apparatus 10 may then cause energy to be provided by the selected device using the first method.

In some example embodiments, determining that an activation signal would arrive with sufficient strength is based at least in part upon at least one of: a strength of a potential activation signal provided by a candidate device; a predicted level of attenuation of the activation signal between said candidate device and device 110; or an activation signal strength at the candidate device needed to enable transmissions in the first mode.

In some example embodiments, the selection of a potential activation signal is based upon at least one of: the capabilities of the candidate device; or an allowable limit of activation signal strength.

In some example embodiments, selecting one of the first and second methods of energy provision comprises determining that there are no candidate devices available for providing energy using the first method of energy provision, or determining that an activation signal provided by a device of one or more candidate devices would not arrive at device 110 with sufficient strength to enable device 110 to make transmissions in the first mode, and, in response, selecting a device for providing energy using the second method of energy provision. Apparatus 10 may then cause energy to be provided by the selected device using the second method.

In some example embodiments, determining that an activation signal provided by a device of the one or more candidate devices would not arrive at device 110 with sufficient strength to enable device 110 to make transmissions in the first mode may be based at least in part upon determining that an activation signal provided by the respective candidate device in the past has not resulted in a backscattered transmission by device 110 that has been received by the network.

In some example embodiments, the first threshold corresponds to an amount of energy that is at least as large as an amount of energy needed by device 110 to make one transmission in the second mode. The one transmission may be a transmission carrying information about device 110's energy deficiency (e.g., the first threshold may correspond to an amount of energy that is large enough to send a transmission in the second mode indicating whether device 110 is storing an amount of energy above a threshold).

In some example embodiments, the received information comprises a response to a query sent by apparatus 10 to a device 110, and the mode is selected based at least in part upon said response.

In some example embodiments, apparatus 10, (or controller 14 thereof) may start a timer. The timer may be reset upon receiving data (e.g., by apparatus 10, from device 110). The query may be provided to the terminal device in response to the timer exceeding a timer threshold (e.g., when a particular amount of time has passed).

In some example embodiments, the timer may be reset if apparatus 10 does not receive a response to the query. In some example embodiments, the timer may be reset if the apparatus receives a response to the query indicating that the terminal device does not have data for transmission. In some example embodiments, the timer may be reset if the apparatus receives a request from the terminal device indicating that the terminal device's stored energy is below the first threshold.

Apparatus 10 may provide to device 110 a second instruction before providing the query, said second instruction being an instruction to operate in the first mode.

The query may comprise an activation signal for backscattering by device 110, and device 110 may modulate the response to the query on the backscattered signal.

In some example embodiments the received information comprises a request from device 110, and the mode selected is based at least in part upon said request.

The request may be a request to operate in the first mode.

The request may further include at least one of an amount of data to be transmitted by the terminal device, or a target latency.

Apparatus 10 may receive from device 110 an indication that device 110 is to switch from the first mode to the second mode.

Figure 4:
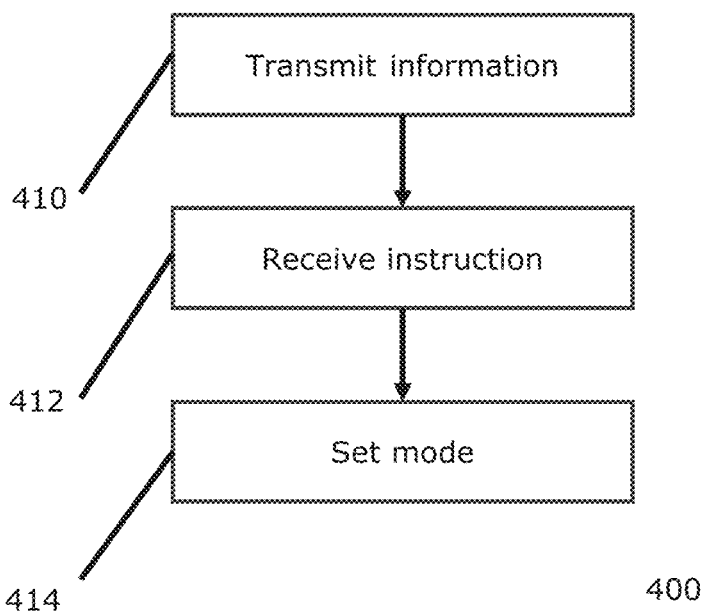

FIG. 4 is a flow diagram of a method 400 according to an example embodiment of the invention. Method 400 may be carried out by an apparatus such as device 110.

At step 410 device 110 transmits information to a network device (which may in some examples be apparatus 10) using transmitter 112. The information may at least indicate whether the device's stored amount of energy is above or below the first threshold.

In some example embodiments the transmitted information comprises a request from device 110 to change modes. In other example embodiments, the transmitted information comprises a response to a query sent from apparatus 10 to a device 110.

At step 412 device 110 receives an instruction from apparatus 10 to operate in a mode of the first and second modes for one or more transmissions.

At step 414 device 110 sets the mode in which the transmission means operates to the selected mode.

In some example embodiments, the first threshold corresponds to an amount of energy that is at least as large as the amount of energy needed by the device to make one transmission in the second mode.

In some example embodiments, device 110 (and in some examples controller 114 in particular) may determine that an amount of energy stored by device 110 is below the first threshold and may provide the information indicating whether device 110's stored energy is above or below the first threshold in response to making said determination. In some examples, said indication may be in the form of a request.

In some example embodiments, device 110 (and in some examples controller 114 in particular) may determine that an amount of energy stored by device 110 is above a second threshold, wherein the second threshold is higher than the first threshold, and set the mode in which the means for transmitting data operates to the second mode in response to making said determination when operating in the first mode. Device 110 may indicate to apparatus 10 that device 110 will operate in the second mode in response to having determined that an amount of energy stored by device 110 is above the second threshold.

In some example embodiments, device 110 receives a query from apparatus 10, and the transmitted information comprises a response to said query, and the mode is selected based at least in part upon said response.

Device 110 may receive a second instruction before receiving the query, said second instruction being an instruction to switch the mode in which the transmitter 112 operates to the first mode, and transmitter 112 may operate in the first mode in response to the receipt of said second instruction.

Transmitting the response to said query may comprise modulating the response on a backscattered transmission.

The response may comprise an indication indicating whether device 110 has data for transmission.

Device 110 may comprise means for determining whether an amount of energy stored by device 110 is below a first threshold and that device 110 has data for transmission to apparatus 10, and in response to making said determination, the transmitter 112 transmit a request to change the mode in which the transmitter 112 is operating to the first mode.

Device 110 may determine an amount of data for transmission and/or a target latency for the data for transmission, and the request to change mode may include an indication of said amount of data for transmission and/or said target latency.

Figure 5:
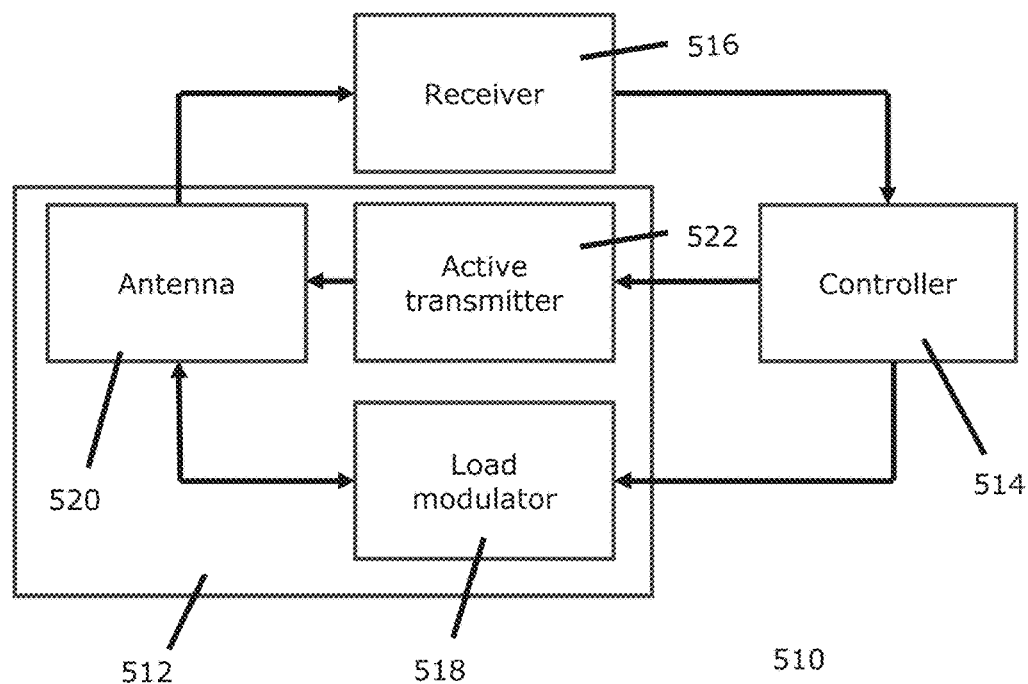
FIGS. 5 and 6 are block diagrams of devices in accordance with example embodiments.

FIG. 5 is a block diagram of an example embodiment of a device 510 (e.g. a terminal device). Device 510 is an example of a device implementing the two modes of transmission of device 110.

Device 510 comprises a transmitter 512, controller 514, and receiver 516. The transmitter 512 comprises an antenna (shared in this embodiment with the receiver 516), said antenna being coupled with an active transmitter and a load modulator.

When the transmitter 512 is operating in an active transmission mode, the active transmitter 522 may generate a signal transmitted by antenna 520. The generated signal may carry modulated data for transmission.

When transmitter 512 is operating in a backscattering transmission mode, load modulator 518 may modulate the load (for example, using switches to vary the load coupled to the antenna). This may result in the backscattered signal being transmitted by the antenna when a suitable activation signal is incident on the antenna.

Figure 6:
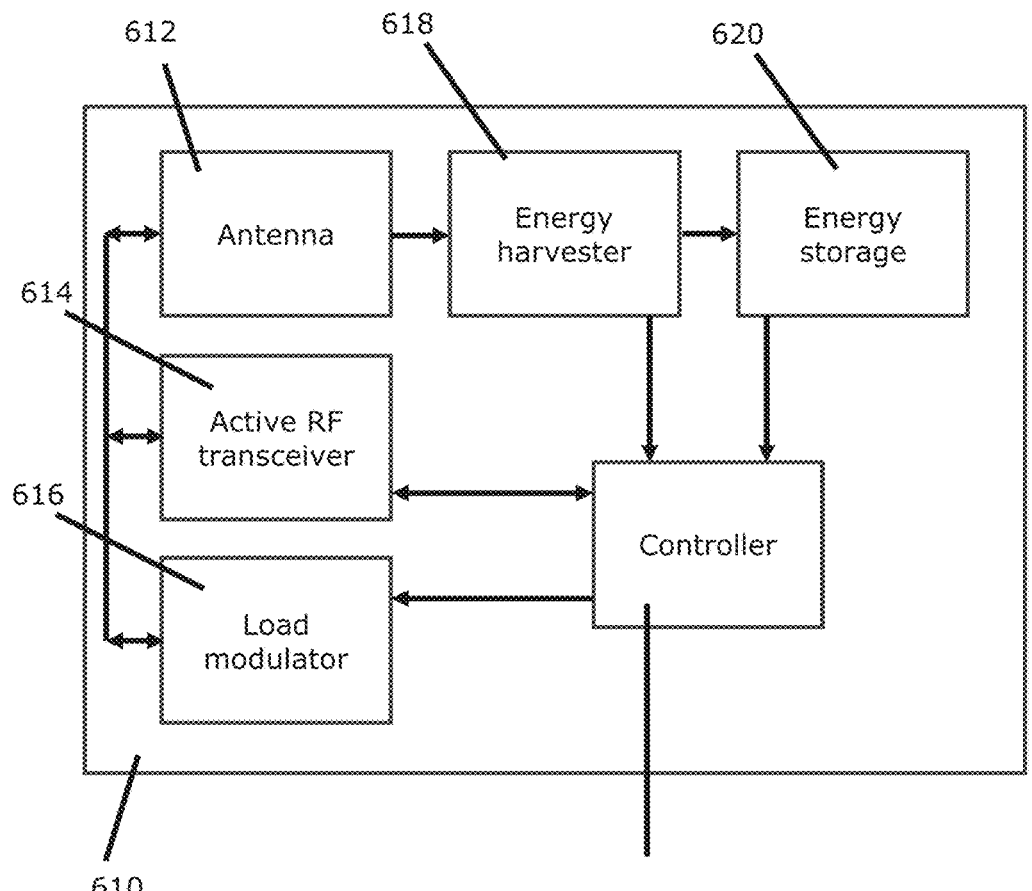

FIG. 6 is a block diagram of a device 610 according to an example embodiment of the invention. The device 610 may be referred to as a Hybrid Energy harvesting device (H-EHD).

Device 610 comprises antenna 612, which in this example embodiment is coupled to active RF transceiver 614. Said transceiver receives transmissions and actively transmits when in an active mode (although, of course, the transceiver could be replaced with separate transmitter and receiver modules). Antenna 612 is further coupled to load modulator 616. By modulating the load, a backscattered signal may be generated to carry data when operating in a backscattering communication mode. In this example embodiment, antenna 612 is further coupled to an energy harvester 618. In some example embodiments, the energy harvester 618 may harvest energy from radio waves picked up by antenna 612.

In this embodiment, antenna 612 is coupled to energy harvester 618, RF transceiver 614, and load modulator 616. It is envisaged that in some embodiments antenna 612 may not be coupled to energy harvester 618. For example, energy harvester 618 may be a solar panel, so may not be capable of harvesting energy from radio waves incident on the antenna.

Energy harvester 618 is coupled to energy storage 620. Energy harvester 618 may harvest sufficient energy to power device 610 over a longer period, but may not be able to satisfy transient power demands, so energy harvester 618 may therefore be coupled to energy storage 620 to retain energy for use in spikes in demand. Energy harvester 618 may harvest energy in several ways. For example, energy harvester 618 may convert radio frequency signals induced in the antenna into DC current suitable for storage in a battery (which may embody energy storage 620 in some examples). In other examples, energy harvester 618 may be a solar panel or a vibration energy harvester.

Energy storage 620 may take several forms. For example, energy storage 620 may be a battery or a capacitor. The form of energy storage may be selected based upon the requirements of device 610 (such as a lifespan or reliability, a capacity, or a voltage). For example, in some use cases energy harvester 618 may be able to harvest power at a constant rate from ambient sources. In this circumstance, energy storage 620 may be selected on the basis that it has the capacity to store an amount of energy harvested between the predicted peaks of energy consumption (e.g., energy storage 620 may store enough energy to power a number of active transmissions, with the harvested energy being expected to replenish this amount between transmissions).

Device 610 comprises controller 622. Controller 622 comprises logic circuits and a memory. Controller 622 may also be responsible for managing power within device 610. Controller 622 may therefore receive energy from energy harvester 618 and/or energy storage 620, and may provide energy to active RF transceiver 614 to power active transmissions. Controller 622 may receive data from transceiver 614 regarding received signals. Controller 622 may receive data from energy harvester 618 and energy storage 620 regarding available power. Controller 622 may receive information from sensors or other data sources of device 610. Controller 622 may make determinations based on these data sources and may determine data for transmission. Controller 622 may store in its memory an indication of a transmission mode to be used and may control which of RF transceiver 614 and load modulator 616 are used to transmit data on this basis.

Figure 7:
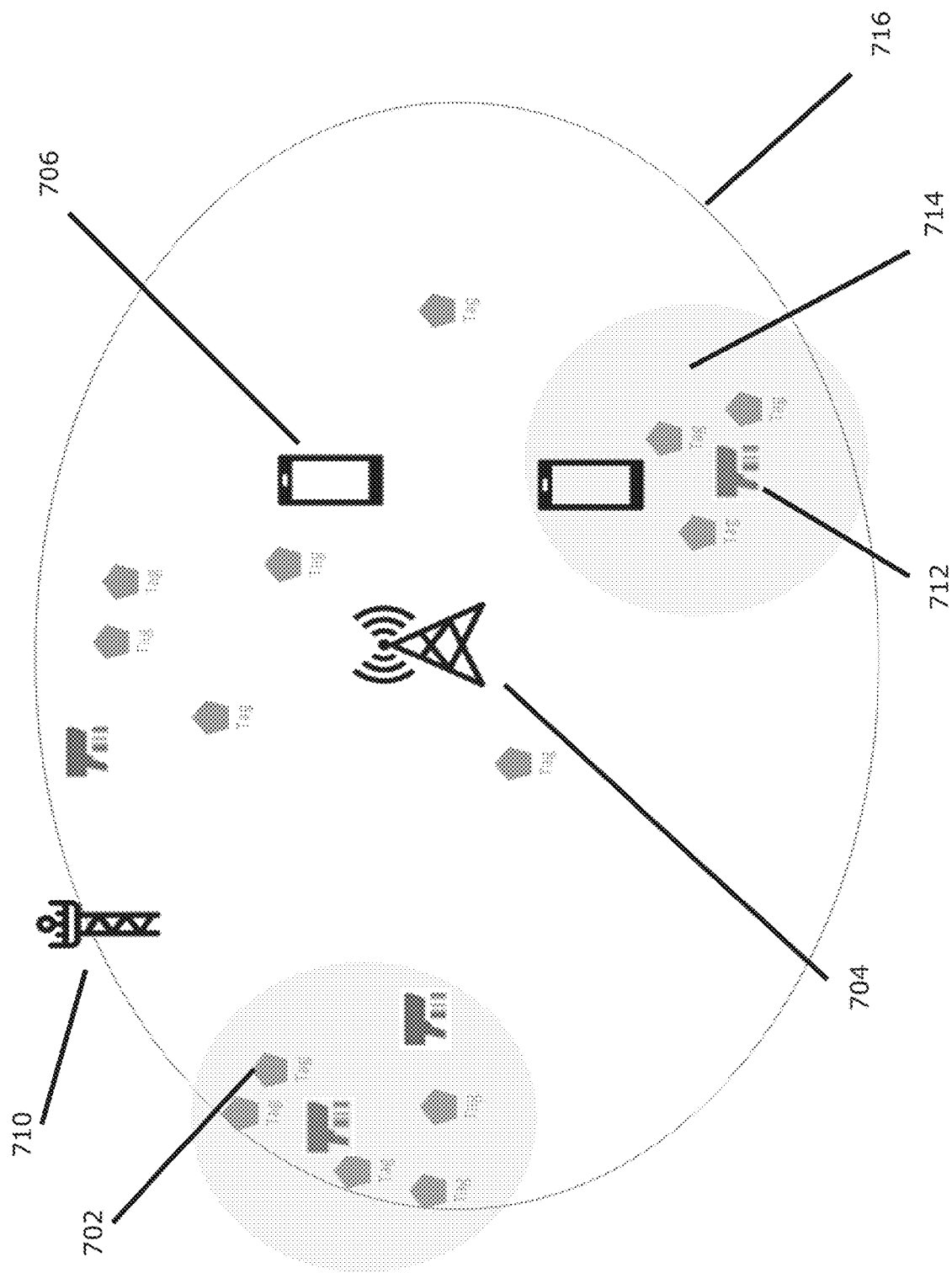
FIG. 7 is a schematic diagram of a scenario in accordance with an example embodiment.

FIG. 7 is a schematic diagram of a scenario in which a plurality of devices (H-EHDs 702 in this example scenario) are placed in a 3GPP network with gNB 704 having corresponding cell 716 and UEs 706. In this scenario, both gNB 704 and UEs 706 can be used for providing wireless power transfer (WPT) to provide energy to H-EHDs 702 for use in active transmission (type C) mode and for providing activation signals for backscattering (type A or B) mode. Both gNB 704 and UEs 706 can also be used to receive the active transmissions or backscattered signals. In some example embodiments, H-EHDs 702 can harvest energy from one or more non-3GPP sources 710 (such as sunlight, ambient artificial lighting, radio waves associated with terrestrial television broadcasts, etc.).

The network of FIG. 7 comprises fixed receivers 712. Said fixed receivers 712 have characteristics of a 5G UE 706, and can communicate with the gNB 704. H-EHDs 702 may be distributed in clusters 714, and fixed receivers 712 may be placed with the clusters 714. It may be advantageous to have devices with capabilities of a UE proximate the H-EHDs 702, so that the gNB 704 may task these devices with providing WPT or activation signals to H-EHDs 702.

The H-EHDs 702 are assumed to be operating in active transmission mode by default. This has the advantage that the 3GPP network does not need to provide an activation signal while said H-EHD 702 has enough energy, preferably harvested from the non-3GPP ambient source 710. Furthermore, H-EHDs 702 operating in active transmission mode can initiate data transmission when they have enough data to transmit. A backscattering mode transmission may be limited by link budget between the activator and the H-EHD 702, and may have limited range.

However, when H-EHD 702 has limited or no energy to make transmissions, it is important for the network to make use of backscattering capabilities to maintain device connectivity with the network, despite the limitations of backscattering.

Figure 8:
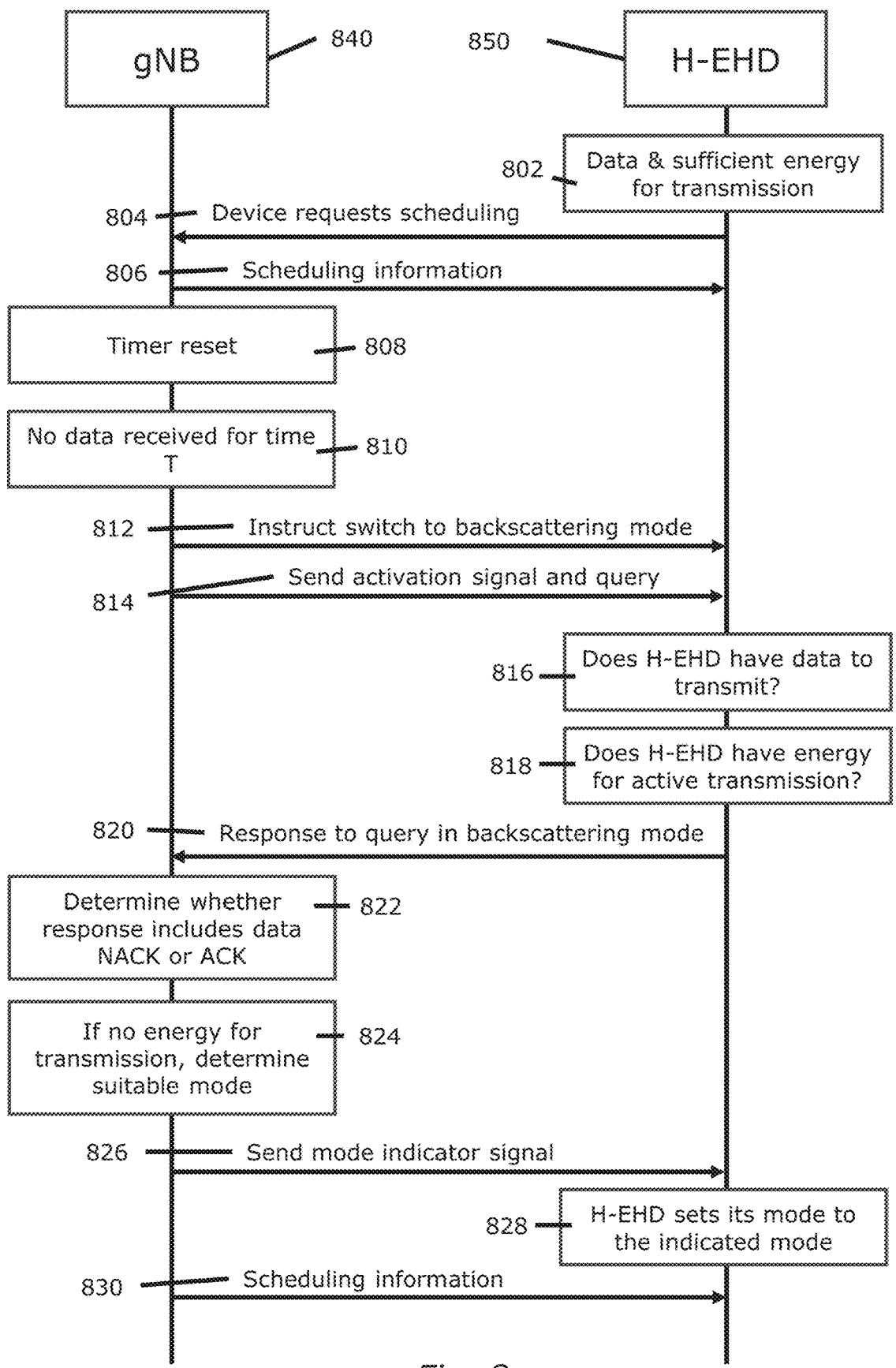
FIGS. 8 to 10 are signalling diagrams of methods in accordance with example embodiments.

FIG. 8 is a signaling diagram according to an example embodiment of the invention showing actions taken at, and messages transmitted between, a network node (gNB) 840 and a device (H-EHD) 850. In this example embodiment, a method by which the transmission mode of a H-EHD may be controlled is provided.

At step 802, the H-EHD determines that it has data for transmission to the gNB and sufficient energy to do so using active transmission. The H-EHD may regularly generate data for transmission (for example, the H-EHD may include a sensor that regularly generates data), or the H-EHD may regularly send short messages to confirm that it has energy, and in either case the gNB may expect to receive regular communications from the H-EHD under normal conditions. Energy status updates without data from the H-EHD to the gNB may avoid the gNB unnecessarily taking actions to determine whether the H-EHD has sufficient power. The H-EHD may obtain energy for its transmissions from non-3GPP sources, such as visible light or broadcast radio waves. Additionally or alternatively, the H-EHD may obtain energy from 3GPP sources, and this may be a result of 3GPP sources such as UEs and gNBs actively directing wireless power transfer signals towards the H-EHD for harvesting. The H-EHD may operate in the active transmission mode by default.

At step 804 and in response, the H-EHD sends a request for scheduling to the gNB. Using active transmission, it is possible for the H-EHD to request resources (e.g., time/frequency resources) from the gNB, and the gNB may configure said resources. Optionally, these resources may also be used for subsequent transmissions.

At step 806, the gNB sends scheduling information to the H-EHD, and then the H-EHD transmits the data for transmission to the gNB.

At step 808, and in response to the transmission scheduled at step 806 from the H-EHD to the gNB, a timer is started or reset. This timer may correspond to or exceed a time within which the H-EHD may be expected to send data to the gNB.

Steps 802-806 are not essential to all example embodiments. The timer could for example be reset or initialized when the gNB first "discovers" the H-EHD, whether this is through active transmission by the H-EHD or backscattering, or at another appropriate time. Additionally, in other example embodiments the timer of step 808 may not be required. Other mechanisms may cause the gNB to send a query to the H-EHD as described below, such as a scheduled check-in with all networked H-EHDs.

At step 810, the timer exceeds a timer threshold, indicating that the H-EHD may have run out of energy and can no longer communicate using active transmission, or an attempt by the H-EHD to communicate with the gNB may have failed. Put in other words, at this step, the gNB determines that the time since the timer was last reset has exceeded a timer threshold. This timer may be configured to be longer than the expected time between transmissions from the H-EHD, or some multiple of this time. This may reduce the number of queries sent by the gNB to the H-EHD when the H-EHD has sufficient power, but its transmissions are received intermittently for other reasons (such as a lack of data).

At step 812, the gNB sends an instruction to the H-EHD to enter the backscattering transmission mode. As the H-EHD device may no longer have sufficient energy for active transmission, the H-EHD may be unable to provide information to the gNB when operating in the active transmission mode, and the H-EHD may be unable to communicate by backscattering while in active transmission mode, even if the H-EHD receives an activation signal. Also at this step, the gNB may provide energy to the H-EHD, or cause energy to be provided to the H-EHD (for example, by directing radio waves from the gNB towards the H-EHD, or by causing a UE to direct radio waves towards the H-EHD). This may be necessary if the H-EHD does not have sufficient energy to operate in backscattering transmission mode or process the instruction to enter backscattering mode. The instruction to enter the backscattering transmission mode may cause the H-EHD to enter the backscattering mode for one transmission (to respond to the query), and the H-EHD may need to receive further instructions to enter the backscattering mode again, or the instruction may cause the H-EHD to enter the backscattering mode until it receives instructions to the contrary, in which case the H-EHD will need to be instructed to enter the active transmission mode to reenter the active transmission mode. In other examples, the instruction may cause the H-EHD to enter the backscattering mode for a defined number of transmissions (e.g., two transmissions, three transmissions, etc.).

At step 814, the gNB sends a query to the H-EHD in backscattering mode. This query requests two pieces of information. First, it requests that the H-EHD confirms whether it has data to transmit. Second, it requests that the H-EHD confirms whether it has enough energy to make a transmission in the active transmission mode. This information is to confirm whether the gNB's timer expired due to the H-EHD's energy deficiency or due to another reason, including packet loss, as it is envisaged that no or a very limited HARQ system may be available for AIOT devices in some implementations. To avoid this query, H-EHD can be made to send short "dummy" data at intervals shorter than the timer threshold if it has nothing to transmit. Also at step 814, the gNB may send an activation signal to the H-EHD, to backscatter its data. The H-EHD will modulate the response to the query in this backscattered signal. In some embodiments the activation signal and query are separately sent to the H-EHD, and in other embodiments the activation signal and query are sent together.

At step 816, the H-EHD determines whether it has data to transmit. If the H-EHD does have data to transmit it can include an ACK signal for data in the response to the query, while if the H-EHD does not have data to transmit it can include a NACK signal for data in the response to the query.

At step 818, the H-EHD determines whether it has sufficient energy to make an active transmission in the active transmission mode. In particular, the H-EHD may determine whether it has sufficient energy to transmit some or all of the data that it is to transmit in the active transmission mode. In some example embodiments the amount of energy needed (or estimated to be needed) to transmit some of the data in the active transmission mode may be associated with a threshold that the H-EHD may compare to an amount of energy stored by the H-EHD. In other example embodiments, a threshold may be defined based on the amount of energy needed (or estimated to be needed) to transmit all of the data in the active transmission mode. If the H-EHD has sufficient energy it includes in the response the ACK signal for energy. If the H-EHD has insufficient energy it includes the NACK signal for energy in the response.

At step 820, the H-EHD modulates a response including the aforementioned determination results onto the backscattered signal, and this response is received by the gNB. The response to the query may further include information on the size of the data to be transmitted, and the latency requirements for the transmission.

At step 822, the gNB determines whether the response includes a data NACK signal. If the response includes a data NACK signal, the method may return to step 808 to reset and/or restart the timer, as the lack of data to be sent by the H-EHD can be presumed to be the cause of not receiving a transmission before the timer exceeds a threshold. If the response includes a data ACK signal, the method proceeds to step 824.

At step 824, the gNB determines whether the response includes an ACK signal for energy. If the gNB determines that the response includes an ACK signal for data and energy, then the method may proceed to step 830, as the H-EHD has sufficient energy to transmit its data.

If at step 824 the gNB determines that the response includes a NACK signal for energy, the gNB must determine a suitable mode for the H-EHD to operate in. The gNB may take the position of the H-EHD device into account (for example, whether the H-EHD is at the edge of the coverage of the gNB), and the gNB may take the presence and position of other 3GPP devices into account (for example, whether a UE or other device that may provide an activation signal or energy for harvesting to the H-EHD is present).

The gNB therefore decides whether the H-EHD should transmit the data using backscattering communication, and/ or whether the H-EHD should be provided with energy to enable active transmission. If the gNB decides that energy should be provided to the H-EHD, it must then decide on the source of that energy, for instance, the gNB may decide on which device should act as a source of RF signals for activation signal or wireless power transfer.

While backscattering communication may be suitable for the response to the query, it may be unsuitable for transmitting large volumes of data, as comparably less data can typically be included into a backscattered communication than an active transmission of similar length, and if the H-EHD is distant from the gNB (or another source of an activation signal) the activation signal may need to be powerful for the backscattered signal to have sufficient strength. If the activation signal required is too powerful, this may generate an unacceptable level of interference.

Wireless power transfer (WPT) to the H-EHD may be suitable if powerful sources of wireless power are present near the H-EHD, or if the latency requirements are low (i.e., the data is not urgent), so a longer energy harvesting period is appropriate. However, for small amounts of data that have strict latency requirements, backscattering may be preferable.

The gNB therefore decides at this stage on the mode of transmission that the H-EHD should use, and, if applicable, the source of energy that should provide energy to the H-EHD. Said deciding on an energy source may be deciding on a source of a backscattering activation signal, or deciding on a source of a wireless power transfer signal.

The gNB may need to decide which of several 3GPP devices should be used as the energy source, such as a power beacon, UEs, or the gNB itself. Whether a source may be used may depend on the gNB link budget and the link budget of the potential source (such as a UE).

The decisions regarding which mode to use and which energy source to use may not be completely independent. For example, if no suitable alternative energy sources are available to provide WPT or activation signals, and the H-EHD is at the cell edge, then the required activation signal to generate a suitable backscatter may be so powerful that it would generate an unacceptable amount of interference. In this case the gNB may decide to send WPT signals of relatively lower power for a longer period of time, so that the H-EHD may transmit in active mode when the energy stored is sufficient. If the H-EHD is close to the gNB, backscattering mode may be preferable because longer range is not required and backscattering mode may consume less energy.

This decision could be made based on simple rules (e.g., H-EHDs within a certain distance of the gNB or their nearest UE should use backscattering mode, and otherwise WPT should be used), or the gNB could use more complicated rules (e.g., the gNB could compare the time required to provide sufficient energy using WPT from different possible sources to latency requirements, and/or compare the required power of the backscattering activation signal from different possible sources to allowable limits as part of its determinations), and make the decision based upon these factors.

Once the gNB has determined the mode of transmission to be used, at 826 the gNB sends a mode indicator signal to the H-EHD. In some example embodiments the gNB is aware of the current mode of the H-EHD and only sends a mode indicator signal if the mode is to change. In other embodiments, the gNB sends a mode indicator signal regardless. While the gNB decides on which mode should be used and which energy source should be used, it may not be necessary to communicate the energy source to the H-EHD, as information on the source of the activation signal or the source of the WPT may not be needed by the H-EHD.

At step 828, and in response, the H-EHD sets its mode to the mode indicated by the mode indicator signal. Depending on what mode is chosen by the gNB and whether the instruction at step 812 caused the H-EHD to enter backscattering mode for one transmission only, or indefinitely, this may mean that the mode does not change.

At step 830, if the mode selected at step 824 is the active transmission mode, or if the H-EHD was determined to have sufficient energy for active transmission, the gNB sends scheduling information to the H-EHD for active transmission. The gNB may also provide the H-EHD with an RF signal (such as a WPT signal) at this step, or cause the H-EHD to be provided with RF signal (e.g. by providing instructions to a UE), if the H-EHD was determined to have insufficient energy.

If the mode selected at step 824 was the backscattering mode, the gNB may instead send an activation signal to the H-EHD, or cause an activation signal to be sent (for example, by a UE), to be backscattered by the H-EHD.

The mode indicator signal at step 826 may instruct the H-EHD to enter the backscattering mode for only one or a fixed number of transmissions. If the harvested energy is expected to improve fast before the next transmission, this may be suitable. Otherwise, switching back to the active transmission mode after only one backscattering transmission may cause the above procedure to be repeated.

In some embodiments, this is avoided by having the mode indicator signal at step 826 instruct the H-EHD to enter the backscattering mode until some condition is met.

In some embodiments, the gNB may send activation signals to the H-EHD regularly, so that data from the H-EHD may be modulated into the backscatter regularly.

While the above example method has been described by reference to a H-EHD in a network with a gNB, the aspects of the above method can be extended to other communication systems including terminal devices (such as the H-EHD) and network devices (such as the gNB). For example, aspects of the above method could be applied to a system in which a terminal device is in receipt of unreliable energy from any source. For example, an instruction from the network device to switch modes could be useful for maintaining a minimum level of communication between the terminal device and network device if an emergency or other circumstance causes the terminal device to lose power. In such a situation, the terminal device may normally operate using grid power (from a national or regional power grid or a combustion powered generator for example) and may rely on unpowered backscattering communication if grid power becomes unavailable.

Figure 9:
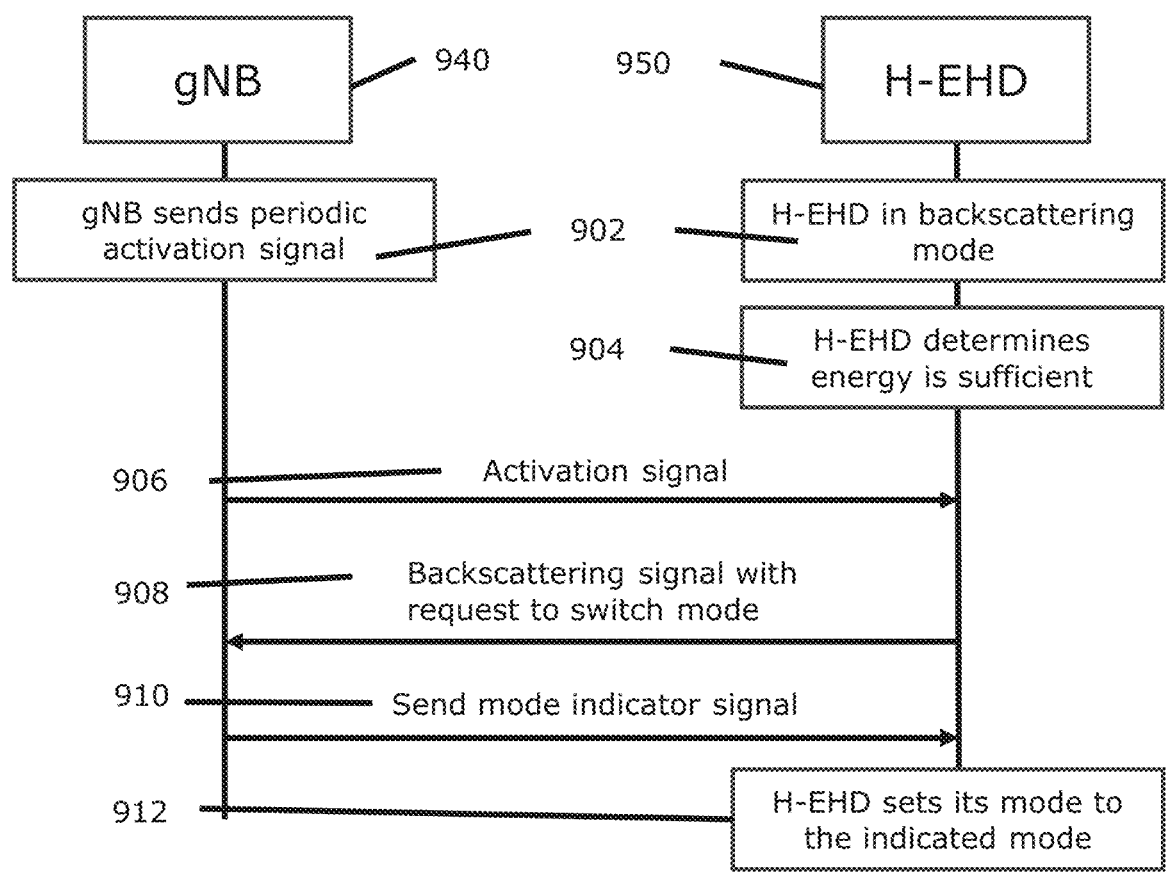

FIG. 9 is a signaling diagram according to an example embodiment of the invention showing actions taken at, and messages transmitted between, a network node (gNB) 940 and a device (H-EHD) 950. In this example embodiment, a method by which the H-EHD may return to the active transmission mode from the backscattering mode is provided.

In some example embodiments, this method follows the method of FIG. 8.

In some example embodiments, the H-EHD can by default switch back to the active transmission mode after making one backscattering transmission, and the network may be required to repeat the above procedure if it still does not receive a transmission after expiry of the timer again.

This may not be efficient if the time T after which the gNB sends a further query to the H-EHD is short, and the harvested energy is not expected to improve sufficiently in this time. Rather than returning to the active transmission mode by default, in some example embodiments the H-EHD may provide an explicit mode change indication when it has sufficient energy to operate in the active transmission mode by sending an indication signal with backscattered data that it has enough energy to operate in the active transmission mode, and the gNB can stop sending the activation signal on receiving this message. This signaling assumes that gNB is acting as an activator but similar signaling may be used if another 3GPP device is used as activator. In such cases, the H-EHD message may be received by a reader device and forwarded to the activator device through the 3GPP network, which may then stop sending activation signals.

At step 902, the H-EHD is in backscattering mode. To retrieve data from the H-EHD, the gNB may send an activation signal to the H-EHD (or cause an activation signal to be sent).

At step 904, the H-EHD determines that it should enter active transmission mode. This may be based on one or more of, or a combination of: the H-EHD determining that its energy storage is above a second threshold, the H-EHD determining that the rate at which it is harvesting energy is above a threshold, or the H-EHD determining that it has data for transmission above a certain size.

At step 906, the gNB sends the activation signal as usual.

At step 908, the H-EHD sends the gNB the data for transmission in the backscattered signal, and also the H-EHD also includes in the backscattered signal a request to switch back to the active transmission mode. In some example embodiments the H-EHD may send the request without sending the data.

Upon receipt of the request at step 908, the gNB may determine that it is no longer necessary to send activation signals to the H-EHD, as the H-EHD intends to transmit in the active mode. The gNB may therefore stop sending activation signals. If the gNB has tasked another network device with sending activation signals to the H-EHD, the gNB may instruct that device to stop sending activation signals.

At step 910, the gNB sends the H-EHD an instruction or an acknowledgement to switch mode to the active transmission mode. In some embodiments, the H-EHD may determine that it has not received an activation signal in a particular amount of time and determine that it is to transmit in the active transmission mode. In some embodiments the gNB does not send an instruction or acknowledgement at step 910 and relies upon the H-EHD determining that it is to change modes from the lack of activation signals, and/or from storing sufficient energy. In some embodiments, the H-EHD may switch to the active mode either when it receives an instruction or acknowledgement to do so, when it does not receive activation signals, or when an amount of stored energy is above a threshold.

At step 912, in response, the H-EHD sets its mode to the active transmission mode. From this point, the H-EHD is operating in the active transmission mode, and steps 802-808 of the method of FIG. 8 may take place, and may repeat until step 810 or another process takes place.

Figure 10:
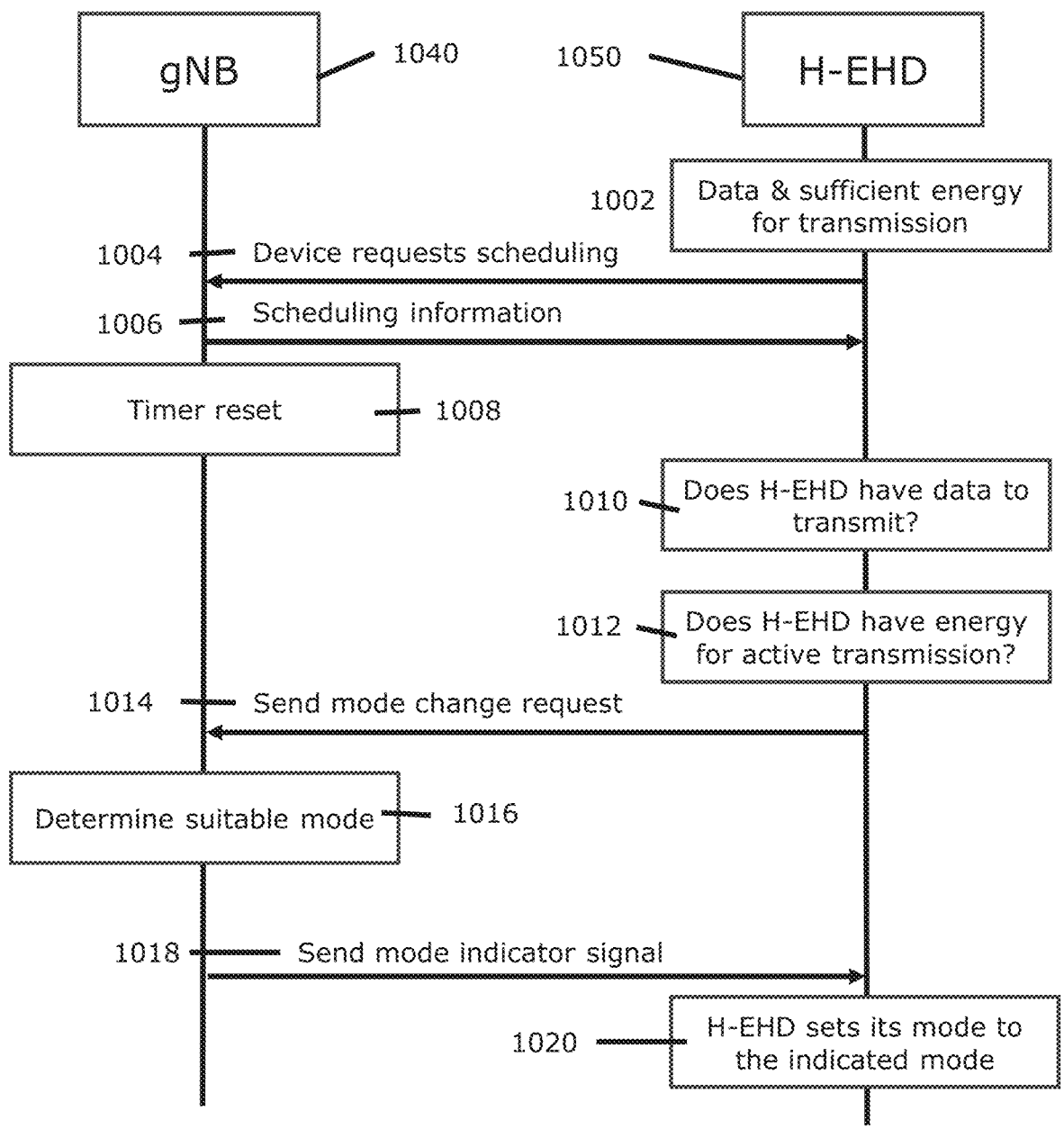

FIG. 10 is a signaling diagram according to an example embodiment of the invention. In this example embodiment, a method by which a H-EHD 1050 may request to change its mode of transmission is provided. In a previously discussed embodiment, it was gNB 840 (or other network device) that determined that H-EHD 850 should be queried (for example, because the H-EHD may have run out of energy). In this embodiment H-EHD 1050 sends a request to gNB 1040 to change mode.

Steps 1002-1008 correspond to steps 802-808 of the method of FIG. 8. These steps may represent normal operation in the active transmission mode in the presence of sufficient harvested energy in some example embodiments.

It is not essential to all example embodiments that step 1010 is preceded by these steps.

At step 1010, the H-EHD determines that it has data to transmit. The H-EHD may determine a size of the data for transmission, and a latency target.

At step 1012, the H-EHD determines whether sufficient energy is available for active transmission of the data.

If at step 1012 the H-EHD determines that there is insufficient energy available for active transmission, at step 1014 the H-EHD sends a mode change request to the gNB. This mode change request may in some example embodiments merely indicate that the H-EHD intends to use a backscattering mode of transmission. In other embodiments the mode change request may include information indicating such as for example, the amount of data for transmission, and the latency target for this transmission, so that the gNB may make a better informed decision on the transmission mode that the H-EHD is to use.

This mode change request is transmitted in the active transmission mode, as the gNB has not been prompted to send activation signals to the H-EHD to enable backscattering communication. There may therefore be sufficient energy available to the H-EHD for the H-EHD to send a short mode change request, but insufficient energy to send the data for transmission. In other embodiments the H-EHD may send the mode change request if the stored energy is below a threshold (for example, the H-EHD may send the mode change request if its energy drops below a safety margin, even if sufficient energy is available to communicate the data).

If the mode change request is not received by the gNB, the H-EHD may not enter the backscattering mode and may have insufficient power to send a further request. In some embodiments this situation may be resolved by steps 810-826 of the method of FIG. 8 taking place, but having this process in place as a backup is not essential to the working of this method of H-EHD initiated mode switching.

Upon receiving the mode change request, the gNB determines at step 1016 which mode should be used by the H-EHD. The factors considered by the gNB may correspond to those considered at step 824 of the method of FIG. 8.

At step 1018, the gNB sends a signal to the H-EHD, instructing it to use the mode determined at step 1016. This signal may instruct the H-EHD to use this mode for only one communication, a determined number of communications, or until further notice.

At step 1020, the H-EHD sets its mode to the indicated mode accordingly.

In some example embodiments, the method of FIG. 9 may be carried out when the energy in the H-EHD is sufficient.

Figure 11:
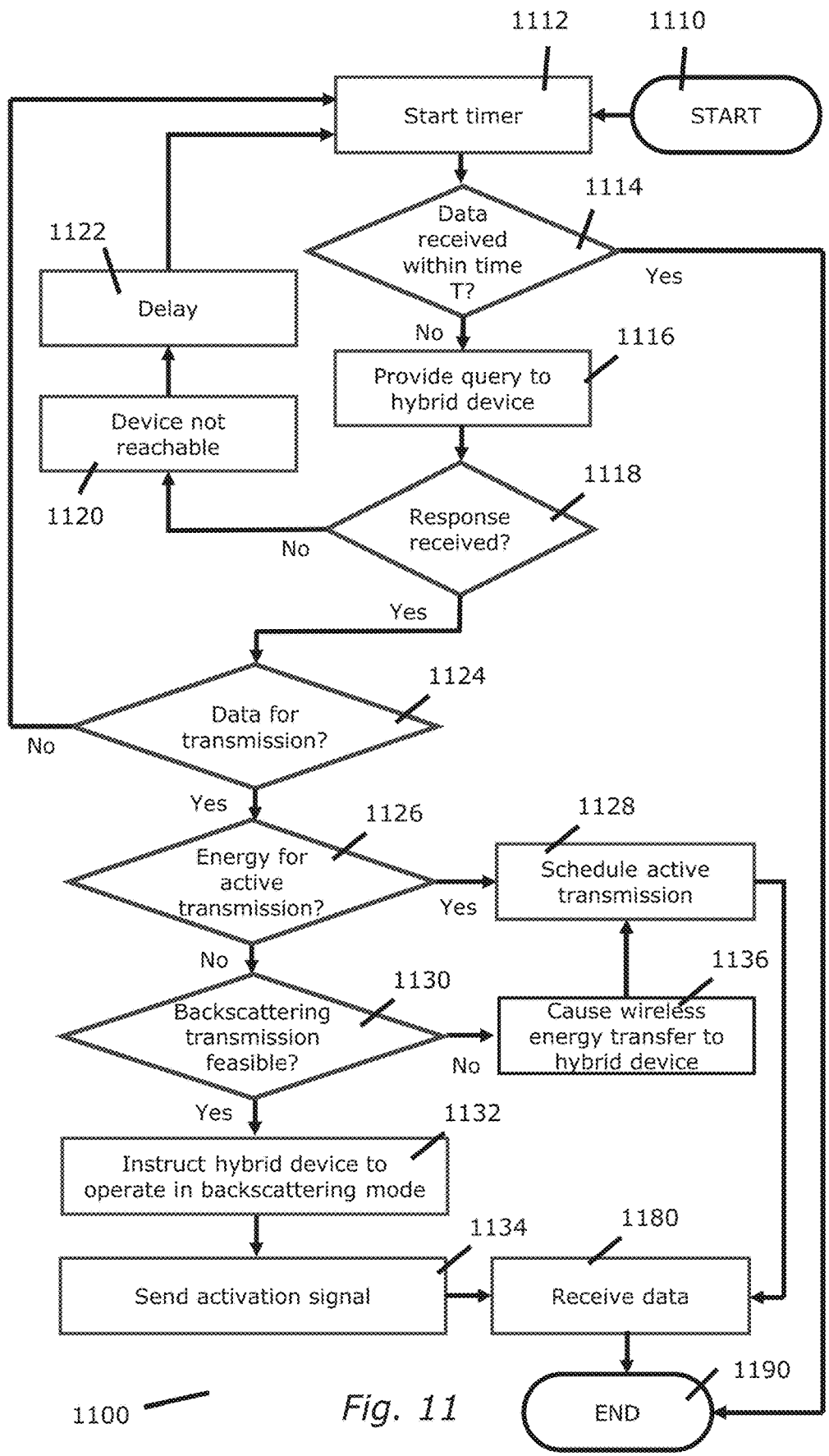
FIGS. 11 and 12 are flow charts showing methods in accordance with example embodiments.

FIG. 11 is a flow diagram showing a method (generally referred to by reference numeral 1100) in accordance with an example embodiment of the invention.

At step 1110, the method starts. This method may be implemented at an apparatus such as apparatus 10 (which may be a gNB) or another suitable network device.

At step 1112, the apparatus starts a timer. This timer may be associated with a particular terminal device in the same network as the apparatus (which may in some examples be a H-EHD).

At step 1114, data from the terminal device may be received before the timer exceeds a timer threshold T, and the method may proceed to the end at step 1190. After step 1190 the method may repeat (i.e., by returning to the start at step 1110), as the terminal device may remain in the network and the apparatus may continue to expect data from the terminal device.

At step 1116, the timer exceeds timer threshold T (i.e., the timer expires), and in response the apparatus provides a query to the terminal device. As discussed in connection with FIG. 8, the timer threshold T may be set such that T is similar to or exceeds the amount of time expected between transmissions from the terminal device, or such that T exceeds some multiple of the amount of time expected between transmissions. This may reduce unnecessary signaling when the terminal device has sufficient energy to communicate.

At step 1118, the apparatus receives (or determines that it has not received) a response to the query. The response comprises information indicating whether the terminal device is storing an amount of energy above or below a first threshold. This information may in some embodiments be a simple ACK or NACK signal indicating whether the amount of energy stored by the terminal device is above the first threshold. In other embodiments this information may be a more precise indication of an amount of energy. In some embodiments the response further comprises an indication of whether terminal device has data for transmission. This information may also be transmitted in the form of an ACK or NACK signal.

At step 1120, the apparatus determines that the terminal device is not reachable upon not receiving a response to the query at step 1118. The terminal device may remain unreachable for some time (e.g., until it moves, or until it harvests sufficient energy to enable active transmission), so the method then proceeds to step 1122. At step 1122 there is a delay before the timer is restarted and the method continues from step 1112. The delay may be selected based upon several factors, including the availability of network resources to send repeated queries and the likelihood that a terminal device becomes reachable in a particular time.

If at step 1118 the apparatus receives a response to the query, the method proceeds to step 1124.

At step 1124, the apparatus determines whether the response to the query indicates that the terminal device has data for transmission (e.g., in the form of a data ACK or NACK signal).

If the response indicates that the terminal device does not have data for transmission, the method returns to step 1112. To avoid unnecessary queries, the terminal device may transmit "dummy" data within a period less than the timer threshold T if it does not have data for transmission.

If the response indicates that the terminal device does have data for transmission, the method proceeds to step 1126. At step 1126, the apparatus determines whether the response indicates that the terminal device is storing an amount of energy above the first threshold (which may correspond to an amount of energy necessary to make a transmission in the active transmission mode).

If at step 1126 the apparatus determines that the response indicates that the terminal device is storing an amount of energy above the threshold, this indicates that transmission of the data in the active transmission mode is possible, and the method proceeds to step 1128.

At step 1128, the apparatus schedules a transmission by the terminal device in the active transmission mode. At step 1180, this scheduled transmission occurs, and the apparatus receives the transmitted data. The method then ends at step 1190, and may repeat as discussed above.

If, at step 1126, the apparatus determines that the terminal device storing an amount of energy that is below/not above the threshold (for instance, if the apparatus received an energy NACK signal in the response), the apparatus may proceed to step 1130.

At step 1130, the apparatus has determined that the terminal device has insufficient energy to make an active transmission. The terminal device may therefore receive energy for storage, so that the terminal device may make an active transmission once the stored energy is sufficient. Additionally or alternatively, the terminal device may receive energy in the form of an activation signal, so that the terminal device may communicate data by backscattering the activation signal. The apparatus may be able to communicate with several network devices (such as UEs) that it may instruct to provide energy to the terminal device. These network devices may have different capabilities, and may be able to provide energy in the form of an activation signal, or provide energy in the form of radio waves from which the terminal device may harvest energy for storage, or devices may be able to provide energy using both methods.

At step 1130 the apparatus determines whether it is feasible to communicate with the terminal device using backscattering transmission. This may include determining which network devices are capable of transferring energy using a particular method (i.e., by providing activation signals or a radio waves for energy harvesting and storage) and which devices are available to transfer energy using a particular method. If a device is available for providing energy in the form of an activation signal, the apparatus may determine if this activation signal would reach the terminal device with sufficient strength to successfully transmit data. This determination may be based on predicted or measured properties of a channel between a candidate device for providing energy and the terminal device, and between the terminal device and a receiver device (which may be the apparatus). This determination may also be based upon the properties of an activation signal that candidate device may generate (e.g., the maximum strength allowed by the network, or the maximum strength allowed by the hardware or settings of the candidate device).

If a candidate device is available for providing energy in the form of an activation signal, and the activation signal is predicted to reach the terminal device with sufficient strength to successfully transmit data, the apparatus may determine that it is feasible to communicate with the terminal device using backscattering, and proceed to step 1132. In contrast, if no suitable candidate device for providing an activation signal is identified, the apparatus may determine that backscattering communication is not feasible, and proceed to step 1136. In either case, the apparatus may have selected a method of providing energy to the terminal device, and a source (or sources) of that energy (which may for example be the gNB or another device such as a UE).

At step 1132, the apparatus may instruct the terminal device to operate in the backscattering mode and proceed to step 1134.

At step 1134, the apparatus may cause the activation signal to be sent to the terminal device. If the apparatus is selected as the source of the activation signal, the apparatus may send the activation signal. If another device such as a UE is selected as the source of the activation signal, the apparatus may instruct said device to send the activation signal. Once the activation signal is sent, the method may proceed to step 1180, as the terminal device may transmit data using backscattering transmission.

At step 1136, the apparatus may cause energy to be transferred wirelessly to the terminal device for storage by the terminal device. This energy may be transferred as a radio wave. The energy may be transferred to the terminal device by one network device (such as the apparatus or a UE) or multiple devices (such as the apparatus and a UE, or multiple UEs, or the apparatus and multiple UEs). Once sufficient energy has been transferred (for example, once the energy stored by the terminal device recovers above the first threshold), the method may proceed to step 1128. For example, the terminal device may request scheduling for an active transmission once it determines that its energy has recovered above a threshold (which may be the first threshold, or which may be a higher threshold).

At step 1180, the apparatus has received data from the terminal device, and the method may end at step 1190. As discussed above, the method may repeat.

Figure 12:
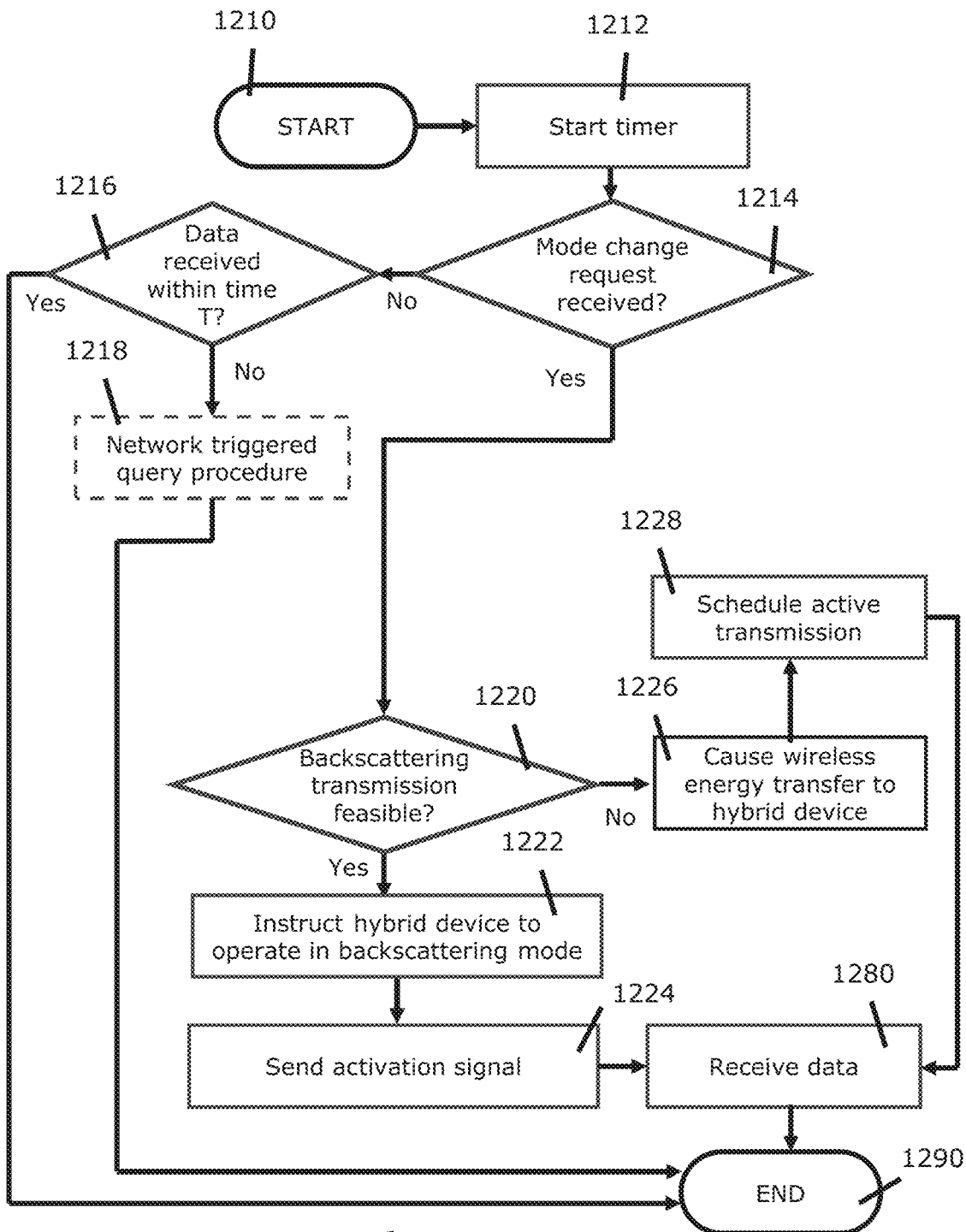

FIG. 12 is a flow diagram showing a method (generally referred to by reference numeral 1200) in accordance with an example embodiment of the invention.

At step 1210, the method starts. This method may be implemented at an apparatus such as apparatus 10 (which may be a gNB) or another suitable network device.

At step 1212, the apparatus starts a timer. This timer may be associated with a particular terminal device in the same network as the apparatus (which may in some examples be a H-EHD).

At step 1214, the apparatus receives, or does not receive, a mode change request from the terminal device.

If the apparatus does not receive a mode change request, the method proceeds to step 1216. At step 1216, the apparatus receives, or does not receive data within a timer threshold T. If data from the terminal device is received before the timer exceeds a timer threshold T, the method may proceed to the end at step 1290. After step 1290 the method may repeat (i.e., by returning to the start at step 1210), as the terminal device may remain in the network and the apparatus may continue to expect data from the terminal device. If data from the terminal device is not received by the time that the timer exceeds the timer threshold T, the method may proceed to step 1218, at which the steps of method 1100 may take place, starting from step 1116 (for example, it may be assumed that the terminal device has run out of energy if it does not send data or a mode change request within time T, so the device could not send a mode change request, and this may be because such a request was sent and not received).

If the apparatus does receive a mode change request at step 1214, the method may proceed to step 1220. At step 1220, the apparatus determines whether backscattering transmission is feasible. There may be no need to separately determine whether the terminal device has sufficient energy for active transmission, as the receipt of a mode change request may be sufficient indication that the terminal device has insufficient energy. The mode change request may indicate that an amount of energy stored by the terminal device is below the first threshold.

Step 1220 of determining whether backscattering transmission is feasible may be carried out in the same or a similar manner to step 1130 of method 1100, and steps 1222, 1224, 1226, 1228, 1280, and 1290 may be carried out in the same or a similar manner to respective steps 1132, 1134, 1136, 1128, 1180, and 1190 of method 1100.

Figure 13:
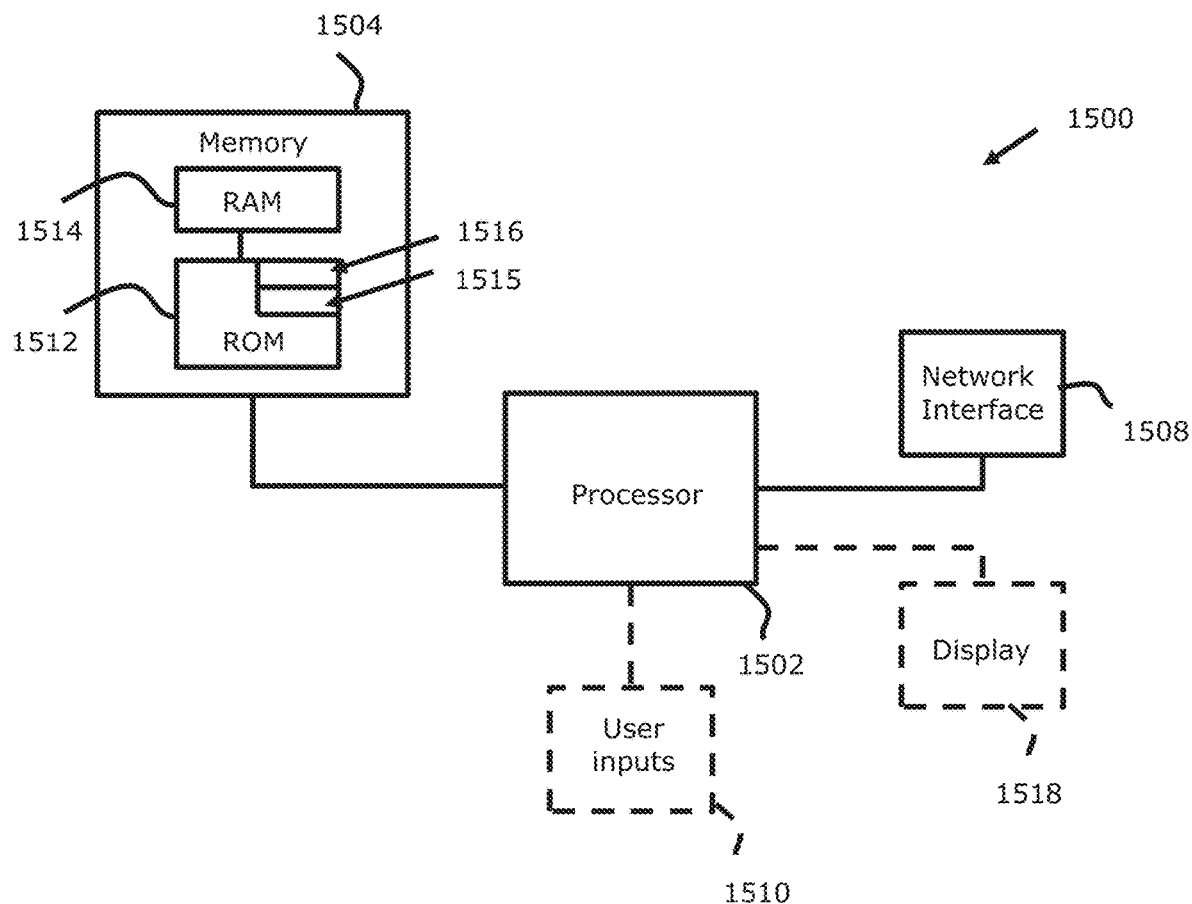
FIG. 13 is a block diagram of components of a system in accordance with an example embodiment.

For completeness, FIG. 13 is a schematic diagram of components of one or more of the example embodiments described previously, which hereafter are referred to generically as a processing system 1500. The processing system 1500 may, for example, be comprised by the apparatus referred to in the claims below.

The processing system 1500 may have a processor 1502, a memory 1504 closely coupled to the processor and comprised of a RAM 1514 and a ROM 1512, and, optionally, a user input 1510 and a display 1518. The processing system 1500 may comprise one or more network/apparatus interfaces 1508 for connection to a network/apparatus, e.g. a modem which may be wired or wireless. The network/apparatus interface 1508 may also operate as a connection to other apparatus such as device/apparatus which is not network side apparatus. Thus, direct connection between devices/apparatus without network participation is possible.

The processor 1502 is connected to each of the other components in order to control operation thereof.

The memory 1504 may comprise a non-volatile memory, such as a hard disk drive (HDD) or a solid state drive (SSD). The ROM 1512 of the memory 1504 stores, amongst other things, an operating system 1515 and may store software applications 1516. The RAM 1514 of the memory 1504 is used by the processor 1502 for the temporary storage of data. The operating system 1515 may contain code which, when executed by the processor implements aspects of the methods 300, 400, 1100, and 1200 described above, along with aspects of the signalling steps of FIGS. 8, 9, and 10. Note that in the case of small device/apparatus the memory can be most suitable for small size usage i.e. not always a hard disk drive (HDD) or a solid state drive (SSD) is used.

The processor 1502 may take any suitable form. For instance, it may be a microcontroller, a plurality of microcontrollers, a processor, or a plurality of processors.

The processing system 1500 may be a standalone computer, a server, a console, or a network thereof. The processing system 1500 and needed structural parts may be all inside device/apparatus such as IoT device/apparatus i.e. embedded to very small size.

In some example embodiments, the processing system 1500 may also be associated with external software applications. These may be applications stored on a remote server device/apparatus and may run partly or exclusively on the remote server device/apparatus. These applications may be termed cloud-hosted applications. The processing system 1500 may be in communication with the remote server device/apparatus in order to utilize the software application stored there.

Figure 14:
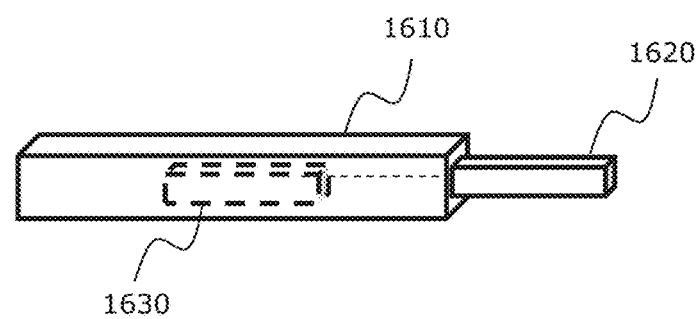
FIG. 14 shows an example of tangible media for storing computer-readable code which when run by a computer may perform methods according to example embodiments described above.

FIG. 14 shows a tangible media, in the form of a removable memory unit 1610, storing computer-readable code which when run by a computer may perform methods according to example embodiments described above. The removable memory unit 1610 may be a memory stick, e.g. a USB memory stick, having internal memory 1630 storing the computer-readable code. The internal memory 1630 may be accessed by a computer system via a connector 1620. Of course, other forms of tangible storage media may be used, as will be readily apparent to those of ordinary skilled in the art. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow and signalling diagrams of FIGS. 3, 4, 8, 9, 10, 11, and 12 are examples only and that various operations depicted therein may be omitted, reordered and/or combined.

It will be appreciated that the above-described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor and at least one memory storing instructions that, when executed by the at least one processor, cause the apparatus at least to:
   start a timer;
   reset the timer upon receiving data from a terminal device, said terminal device comprising: a transmitter configured to transmit data in first and second modes, wherein, in the first mode transmitting data comprises modulating said data on a backscattered signal, and wherein, in the second mode transmitting data comprises actively generating and transmitting a signal on which said data is modulated;
   send a query to the terminal device in response to the timer exceeding a timer threshold;
   obtain information associated with one or more transmissions from a terminal device, the information comprising a response to the query;
   determine from said information whether said terminal device's stored energy is above or below a first threshold;
   select the second mode if the amount of energy stored by said terminal device is above said threshold, and select the first or second mode if the amount of energy stored by said terminal device is below said threshold; and
   provide to said terminal device an instruction to operate in the selected mode for one or more transmissions.

2. The apparatus of claim 1 wherein the instructions stored on the memory, when executed by the at least one processor, further cause the apparatus at least to:
   select one of a first and a second method of energy provision in response to determining that said terminal device's stored energy is below said first threshold, wherein said first method of energy provision comprises providing an activation signal for backscattering by said terminal device, and wherein said second method of energy provision comprises providing a radio frequency signal for energy harvesting by said terminal device;

select the first mode in response to selecting the first method of energy provision, and select the second mode in response to selecting the second method of energy provision; and provide energy to the terminal device using the selected method of energy provision; and additionally or alternatively provide an instruction to a further device to provide energy to the terminal device using the selected method of energy provision.

3. The apparatus of claim 2, wherein the instructions stored on the memory, when executed by the at least one processor, further cause the apparatus at least to:

identify one or more candidate devices available for providing energy using the first method of energy provision;

determine whether an activation signal provided by a device of the one or more candidate devices would arrive at the terminal device with sufficient strength to enable the terminal device to make transmissions in the first mode, wherein the first method of energy provision is selected based at least in part on making said determination;

select a device of the one or more candidate devices as a source of energy based at least in part upon determining that an activation signal generated by said device would arrive at the terminal device with sufficient strength to enable transmissions by the terminal device in the first mode; and provide energy to the terminal device using the first method of energy provision if the selected device is the apparatus; and additionally or alternatively provide an instruction to a further device to provide energy to the terminal device using the first method of energy provision if the selected device is said further device.

4. The apparatus of claim 3, wherein said determining whether an activation signal would arrive with sufficient strength is based at least in part upon at least one of: a strength of a potential activation signal provided by a candidate device;

a predicted level of attenuation of the activation signal between said candidate device and the terminal device; or an activation signal strength at the candidate device needed to enable transmissions in the first mode.

5. The apparatus of claim 4, wherein the instructions stored on the memory, when executed by the at least one processor, further cause the apparatus at least to select a potential activation signal based upon at least one of: the capabilities of the candidate device; or an allowable limit of activation signal strength.

6. The apparatus of claim 2, wherein the instructions stored on the memory, when executed by the at least one processor, further cause the apparatus at least to:

determine whether there are no candidate devices available for providing energy using the first method of energy provision, or determine whether an activation signal provided by a device of one or more candidate devices would not arrive at the terminal device with sufficient strength to enable the terminal device to make transmissions in the first mode;

select a device for providing energy using the second method of energy provision in response to determining that there are no candidate devices available for providing energy using the first method of energy provision, or in response to determining that an activation signal provided by a device of one or more candidate devices would not arrive at the terminal device with sufficient strength to enable the terminal device to make transmissions in the first mode; and provide energy to the terminal device using the second method of energy provision if the selected device is the apparatus; and additionally or alternatively provide an instruction to a further device to provide energy to the terminal device using the second method of energy provision if the selected device is said further device.

7. The apparatus of claim 6, wherein the determining that an activation signal provided by a device of the one or more candidate devices would not arrive at the terminal device with sufficient strength to enable the terminal device to make transmissions in the first mode is based at least in part upon determining that an activation signal provided by the respective candidate device in the past has not resulted in a backscattered transmission by the terminal device that has been received by the network.

8. The apparatus of claim 1, wherein the first threshold corresponds to an amount of energy that is at least as large as an amount of energy needed by the terminal device to make one transmission in the second mode.

9. The apparatus of claim 1, wherein the instructions stored on the memory, when executed by the at least one processor, further cause the apparatus at least to reset the timer if the apparatus does not receive a response to the query.

10. The apparatus of claim 1, wherein the instructions stored on the memory, when executed by the at least one processor, further cause the apparatus at least to reset the timer if the apparatus receives a response to the query indicating that the terminal device does not have data for transmission.

11. The apparatus of claim 1, wherein the instructions stored on the memory, when executed by the at least one processor, further cause the apparatus at least to reset the timer if the apparatus receives a request from the terminal device indicating that the terminal device's stored energy is below the first threshold.

12. A method comprising:

starting a timer;

resetting the timer upon receiving data from a terminal device, said terminal device comprising: a transmitter for transmitting data in first and second modes, wherein, in the first mode transmitting data comprises modulating said data on a backscattered signal, and wherein, in the second mode transmitting data comprises actively generating and transmitting a signal on which said data is modulated;

sending a query to the terminal device in response to the timer exceeding a timer threshold;

obtaining information associated with one or more transmissions from a terminal device, the information comprising a response to the query;

determining from said information whether said terminal device's stored energy is above or below a first threshold;

selecting the second mode if the amount of energy stored by said terminal device is determined to be above said threshold, and selecting the first or second mode if the amount of energy stored by said terminal device is determined to be below said threshold; and providing to said terminal device an instruction to operate in the selected mode for one or more transmissions.

13. A non-transitory computer readable storage medium comprising program instructions which stored thereon for performing at least the following:
  starting a timer;
  resetting the timer upon receiving data from a terminal device, said terminal device comprising: a transmitter for transmitting data in first and second modes, wherein, in the first mode transmitting data comprises modulating said data on a backscattered signal, and wherein, in the second mode transmitting data comprises actively generating and transmitting a signal on which said data is modulated;
  sending a query to the terminal device in response to the timer exceeding a timer threshold;
  obtaining information associated with one or more transmissions from a terminal device, the information comprising a response to the query;
  determining from said information whether said terminal device's stored energy is above or below a first threshold;
  selecting the second mode if the amount of energy stored by said terminal device is determined to be above said threshold, and selecting the first or second mode if the amount of energy stored by said terminal device is determined to be below said threshold; and
  providing to said terminal device an instruction to operate in the selected mode for one or more transmissions.

* * * * *